United States Patent
Gilbert et al.

(10) Patent No.: US 7,123,670 B2
(45) Date of Patent: Oct. 17, 2006

(54) FINE FREQUENCY OFFSET ESTIMATION AND CALCULATION AND USE TO IMPROVE COMMUNICATION SYSTEM PERFORMANCE

(75) Inventors: Jeffrey M. Gilbert, Sunnyvale, CA (US); Teresa H. Meng, Portola Valley, CA (US); John Thomson, Santa Clara, CA (US); Yi-Hsu Wang, Palo Alto, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 912 days.

(21) Appl. No.: 09/963,115

(22) Filed: Sep. 24, 2001

(65) Prior Publication Data

US 2003/0058966 A1    Mar. 27, 2003

(51) Int. Cl.
*H04L 27/06* (2006.01)
(52) U.S. Cl. .................................... 375/344; 455/192.2
(58) Field of Classification Search ................ 375/340, 375/344, 319, 224, 346; 455/192.1, 192.2, 455/192.3, 173.1, 182.2, 182.3; 327/307
See application file for complete search history.

(56) References Cited

U.S. PATENT DOCUMENTS

| | | | |
|---|---|---|---|
| 5,233,633 A * | 8/1993 | Baum et al. ................. | 375/344 |
| 5,434,889 A * | 7/1995 | Baier .......................... | 375/344 |
| 5,440,589 A * | 8/1995 | Kaku et al. .................. | 375/344 |
| 5,561,665 A * | 10/1996 | Matsuoka et al. ........... | 370/206 |
| 5,636,246 A | 6/1997 | Tzannes et al. ............. | 375/260 |
| 5,710,796 A * | 1/1998 | Jarvela et al. ............... | 375/344 |
| 5,732,111 A * | 3/1998 | Walley ........................ | 375/344 |
| 5,732,113 A | 3/1998 | Schmidl et al. ............. | 375/355 |
| 5,812,615 A * | 9/1998 | Baum et al. ................. | 375/344 |
| 6,347,126 B1 * | 2/2002 | Nagayasu et al. ........... | 375/344 |
| 6,393,068 B1 * | 5/2002 | Rupp .......................... | 375/326 |
| 6,628,926 B1 * | 9/2003 | van de Beek et al. ........ | 455/75 |
| 6,662,000 B1 * | 12/2003 | Belveze et al. ............. | 455/208 |
| 6,693,983 B1 * | 2/2004 | Moher et al. ................ | 375/341 |
| 6,725,024 B1 * | 4/2004 | Lindoff et al. .............. | 455/255 |
| 6,798,853 B1 * | 9/2004 | Lindbom et al. ............ | 375/344 |
| 6,839,388 B1 * | 1/2005 | Vaidyanathan .............. | 375/326 |
| 2002/0159540 A1 | 10/2002 | Chiodini | |
| 2003/0138064 A1 * | 7/2003 | Malouche et al. .......... | 375/344 |

* cited by examiner

*Primary Examiner*—Jean B. Corrielus
(74) *Attorney, Agent, or Firm*—Bever, Hoffman & Harms, LLP; Jeanette S. Harms

(57) ABSTRACT

A method for correcting influence of frequency offset between a receiver and a transmitter by evaluating training symbols received during a preamble period. The method includes producing, based on at least one long training symbol, a first vector whose first vector angle is indicative of a fine offset between the receiver and the transmitter, producing a fine offset estimate based on the first vector angle, and multiplying, with a signal having a frequency based upon the fine offset estimate, data symbols that are received after the at least one long training symbol is received.

67 Claims, 14 Drawing Sheets

FINE FREQUENCY OFFSET ESTIMATION AND CALCULATION AND USE TO IMPROVE COMMUNICATION SYSTEM PERFORMANCE

FIELD

The present invention pertains generally to automatic frequency control. More particularly, the present invention relates to supplementing a coarse frequency estimate with a fine frequency estimate derived from more data than the coarse frequency estimate and using the fine frequency estimate to improve a communication system's performance.

BACKGROUND

The market for home networking is developing at a phenomenal rate. Service providers from cable television, telephony and digital subscriber line markets are vying to deliver bundled services such as basic telephone service, Internet access and entertainment directly to the consumer. Collectively these services require a high-bandwidth network that can deliver 30 Mbits/s or even higher rates. The Institute of Electrical and Electronic Engineers (IEEE) 802.11a standard describes a cost-effective, robust, high-performance local-area network (LAN) technology for distributing this multimedia information within the home. Networks that will operate in accordance with standard 802.11a will use the 5-GHz UNII (unlicensed National Information Infrastructure) band and may achieve data rates as high as 54 Mbits/s, a significant improvement over other standards-based wireless technology. The 802.11a standard has some unique and distinct advantages over other wireless standards in that it uses orthogonal frequency-division multiplexing (OFDM) as opposed to spread spectrum, and it operates in the clean band of frequencies at 5 GHz.

OFDM is a technology that resolves many of the problems associated with the indoor wireless environment. Indoor environments such as homes and offices are difficult because the radio system has to deal with a phenomenon called "multipath." Multipath is the effect of multiple received radio signals coming from reflections off walls, ceilings, floors, furniture, people and other objects. In addition, the radio has to deal with another frequency phenomenon called "fading," where blockage of the signal occurs due to objects or the position of a communications device (e.g., telephone, TV) relative to the transceiver that gives the device access to the cables or wires of the cable TV, telephone or internet provider.

OFDM has been designed to deal with these phenomena and at the same time utilize spectrum more efficiently than spread spectrum to significantly increase performance. Ratified in 1999, the IEEE 802.11a standard significantly increases the performance (54 Mbits/s vs. 11 Mbits/s) of indoor wireless networks.

The ability of OFDM to deal with multipath and fading is due to the nature of OFDM modulation. OFDM modulation is essentially the simultaneous transmission of a large number of narrow band carriers, sometimes called subcarriers, each modulated with a low data rate, but the sum total yielding a very high data rate. FIG. 1A illustrates the frequency spectrum of multiple modulated subcarriers in an OFDM system. To obtain high spectral efficiency the frequency response of the subcarriers are overlapping and orthogonal, hence the name OFDM. Each narrowband subcarrier can be modulated using various modulation formats such as binary phase shift keying (BPSK), quaternary phase shift keying (QPSK) and quadrature amplitude modulation (QAM) (or the differential equivalent).

Since the bandwidth rate on each subcarrier is low, each subcarrier experiences flat fading in multipath environment and is easy to equalize, where coherent modulation is used. The spectrums of the modulated subcarriers are not separated but overlap. The reason why the information transmitted over the carriers can still be separated is the so called orthogonality relation giving the method its name. The orthogonality relation of the subcarriers requires the subcarriers to be spaced in such a way that at the frequency where the received signal is evaluated all other signals are zero. In order for this orthogonality to be preserved it helps for the following to be true:

1. Synchronization of the receiver and transmitter. This means they should assume the same modulation frequency and the same time-base for transmission (which usually is not the case).
2. The analog components, part of transmitter and receiver, are of high quality.
3. The multipath channel needs to accounted for by placing guard intervals which do not carry information between data symbols. This means that some parts of the signal cannot be used to transmit information.

If the receiver and transmitter are not synchronized in frequency the orthogonality of the subcarriers is compromised and data imposed on a subcarrier may be not be recovered accurately due to inter-carrier interference. FIG. 1B illustrates the effect of the lack of synchronization on the frequency spectrum of multiple subcarriers, The dashed lines show where the spectrum for the subcarrier should be, and the solid lines shows where the spectrum falls due to the lack of synchronization. Since the receiver and transmitter need to be synchronized for reliable OFDM communication to occur, but in fact in practice they are not, it is necessary to compensate for the frequency offset between the receiver and the transmitter. The offset can occur due to the inherent inaccuracy of the synthesizers and crystals in the transmitter and receiver and to drift due to temperature or other reasons. The offset can be compensated for at the receiver, but present methods only produce a coarse estimate of the actual offset. According to one method for compensating for the offset, the analog signal received by a receiver is divided into three sections: short timing symbol section, long timing symbol section and data symbol section. Some of the short timing symbols in the short symbol section are used for automatic gain control and for detecting symbol timing. Other short timing symbols are sampled and digitized and auto-correlated to produce a coarse estimate of the offset. The coarse estimate of the offset is then used to produce a digital periodic signal whose frequency is based on the coarse estimate of the offset. The digital periodic signal is multiplied with digital samples of the long symbols and the product is fast fourier transformed to produce a channel estimate. The digital carrier is also used to multiply digital samples of the data symbols (digital data samples) when they arrive, thereby correcting for the offset. The product of the digital carrier and the digital data samples can now be decoded.

Since the short symbols, from which the frequency offset was derived, are relatively short, the estimate of the offset may be off appreciably from the actual offset. Consequently, there will be a residual offset which may cause the spectrum of one subcarrier to overlap with the spectrum of another subcarrier. Due to the overlap, when the digital data samples are recovered the data for one subcarrier may include interference from an adjacent subcarrier, degrading the throughput of the communication system. Furthermore, since there is a residual offset, the channel estimate is not an accurate representation of the actual transfer function due to the channel.

As described above, existing solutions are not capable of providing a relatively good estimate of the frequency offset between a receiver and transmitter or channel estimate. Consequently, it is desirable to provide a solution that overcomes the shortcomings of existing solutions.

SUMMARY

A method for correcting influence of frequency offset between a receiver and a transmitter by evaluating training symbols received during a preamble period is described. The method includes producing, based on at least one long training symbol, a first vector whose first vector angle is indicative of a fine offset between the receiver and the transmitter, producing a fine offset estimate based on the first vector angle, and multiplying, with a signal having a frequency based upon the fine offset estimate, data symbols that are received after the at least one long training symbol is received.

BRIEF DESCRIPTION OF THE DRAWINGS

The present invention is illustrated by way of example, and not limitation, in the figures of the accompanying drawings in which like references denote similar elements, and in which.

DETAILED DESCRIPTION

A methods and apparatus for methods and apparatus for estimating and calculating frequency offset and for more accurately determining channel estimate are described. In the following description, for purposes of explanation, numerous specific details are set forth in order to provide a thorough understanding of the present invention. It will be evident, however, to one skilled in the art that the present invention may be practiced in a variety of communications signal processing circuits, especially an orthogonal frequency division multiplexing system, without these specific details. In other instances, well-known operations, steps, functions and elements are not shown in order to avoid obscuring the invention.

Parts of the description will be presented using terminology commonly employed by those skilled in the art to convey the substance of their work to others skilled in the art, such as orthogonal frequency division multiplexing, fast fourier transform (FFT), inverse FFT (IFFT), autocorrelation, subcarrier, delay, and so forth. Various operations will be described as multiple discrete steps performed in turn in a manner that is most helpful in understanding the present invention. However, the order of description should not be construed as to imply that these operations are necessarily performed in the order that they are presented, or even order dependent. Lastly, repeated usage of the phrases "in one embodiment," "an alternative embodiment," or an "alternate embodiment" does not necessarily refer to the same embodiment, although it may.

Figure 2:
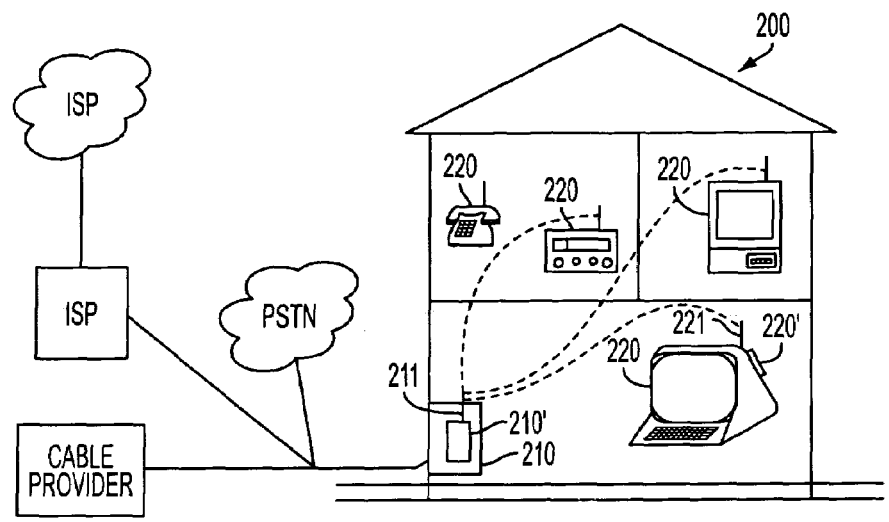
FIG. 2 illustrates a communication system according to one embodiment of the present invention.

FIG. 2 illustrates a communication system according to one embodiment of the present invention. System 200 includes a gateway 210 that is connected via a cable (or multiple cables) to the public switched telephone network (PSTN), a cable television system, an Internet service provider (ISP), or some other system. Gateway 210 includes a transceiver 210' and antenna 211. Each appliance 220 includes a transceiver 220' and antenna 221 (only one labeled). Appliance 220 could be a television, computer, telephone, or some other appliance. Transceiver 210' provides transceiver 220' with a wireless connection to the systems that are connected to gateway 210. According to one embodiment, transceivers 210' and 220' communicate in accordance with the IEEE 802.11a standard. Consequently, each of transceivers 210' and 220' includes a receiver and a transmitter that communicate information formatted according to the 802.11a standard. In alternative embodiments, as indicated below, transceivers 210' and 220' may have some design features that deviate from the IEEE 802.11a standard.

Figure 3:
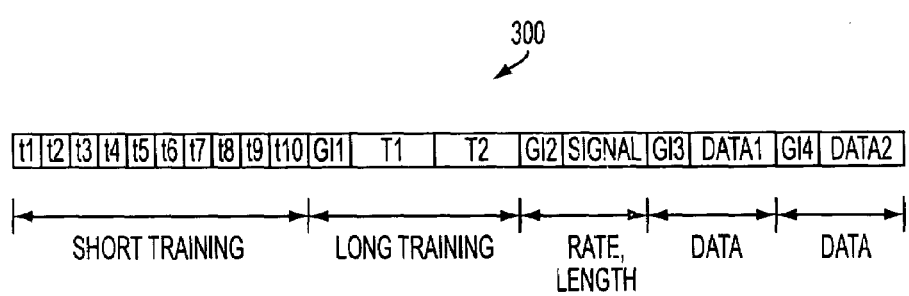
FIG. 3 illustrates the packet structure that the IEEE 802.11a standard requires for information transmission between two transceivers.

FIG. 3 illustrates the packet structure that the IEEE 802.11a standard requires for information transmission between two transceivers. A receiver in transceiver 210' or 220' is designed to accept a packet such as packet 300 and to derive timing information, data, and other information from the packet. For example, in packet 300, the first 10 symbols (t1 to t10), which are referred to as the shorts, are repeated sequences that a receiver uses for detecting symbol timing and coarse carrier frequency offset. GI1 is the cyclic prefix of the two long symbols T1 and T2, and is sometimes referred to as a guard interval because of its use as a rough inter-symbol boundary for absorbing the effect of multipath. GI1 is made long enough such that if short symbol t10 undergoes multipath, symbol t10 will partially "smear" into GI1 without affecting T1. T1 and T2, referred to as the longs, are used for channel estimation, and fine symbol timing adjustment. Since OFDM is extremely sensitive to the carrier frequency offset between the transmitter and the receiver, the present invention provides for successive estimation using T1 and T2 (fine frequency offset estimation), to reduce any residual offset after the shorts.

According to one embodiment, each short symbol takes 0.8 μs, thereby allowing altogether 8 μs to perform automatic gain control (AGC) and coarse symbol timing and frequency offset estimation. According to one embodiment, GI1 takes 1.6 μs, which is twice the amount of the usual cyclic prefix between data symbols. After the shorts, GI1 provides a rough inter-symbol boundary which allows the two longs, T1 and T2, to be captured without multipath effects from the shorts, as the relatively long GI1 is sized to provide an ample buffer zone to absorb any error in symbol boundary. According to one embodiment, T1 and T2 each take up 3.2 μs, and are used to derive two estimates of the channel characteristics, as the data bits transmitted in T1 and T2 are known at the receiver. The two channel estimations are combined and manipulated to form a reference channel estimate for the following data symbols. After the longs, the packet enters into data symbols. Each data symbol is 3.2 μs long and is preceded by a cyclic-prefix of 0.8 μs. The cyclic prefix is used to absorb delay spread caused by multipath so that the OFDM symbols can remain independent from each other. The first symbol is a SIGNAL symbol, which is, according to one embodiment, transmitted in binary phase shift keying (BPSK) with a ½-rate code. The SIGNAL symbol needs to be detected correctly, as it contains the information needed for decoding the rest of the packet, hence the use of BPSK with the ½-rate code. The data symbol can be transmitted in BPSK, quaternary phase shift keying (QPSK), 16-quadrature amplitude modulation (QAM), or 64-QAM with various degrees of error correction, to provide a scaleable set of data rates in response to different channel conditions.

Figures 1, 4A:
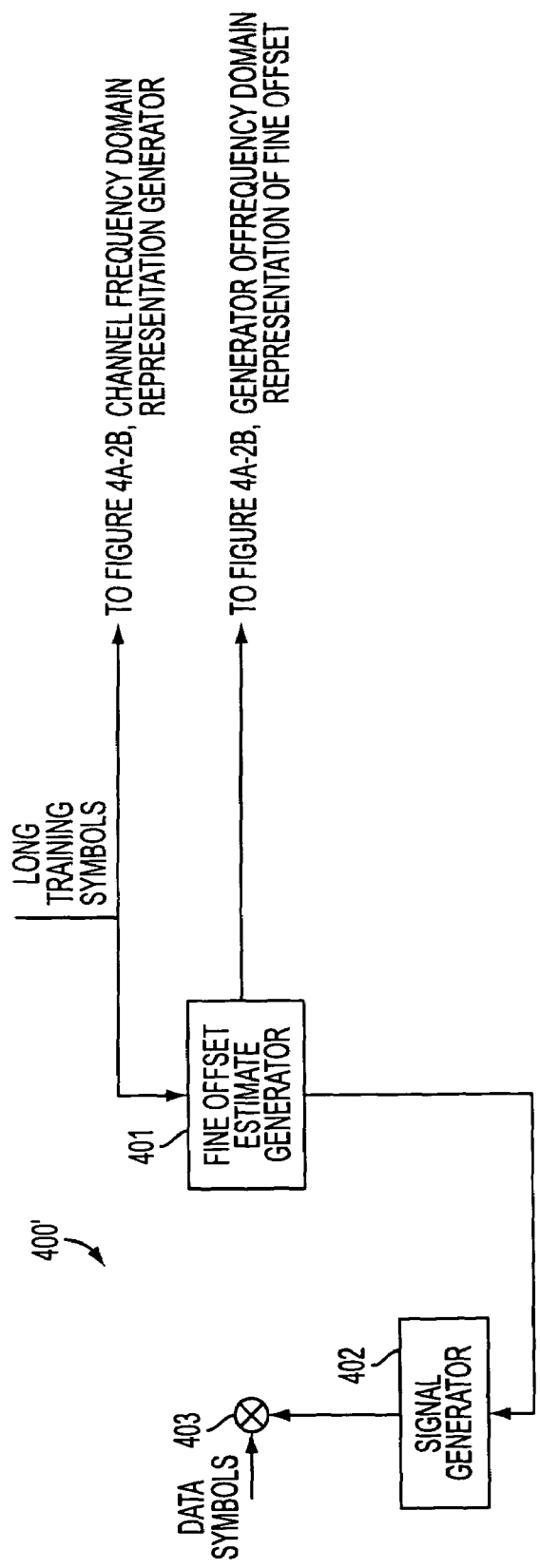
FIG. 4A illustrates a section of a receiver including a fine offset adjustment circuit according to one embodiment of the present invention.
Figures 2, 4A:
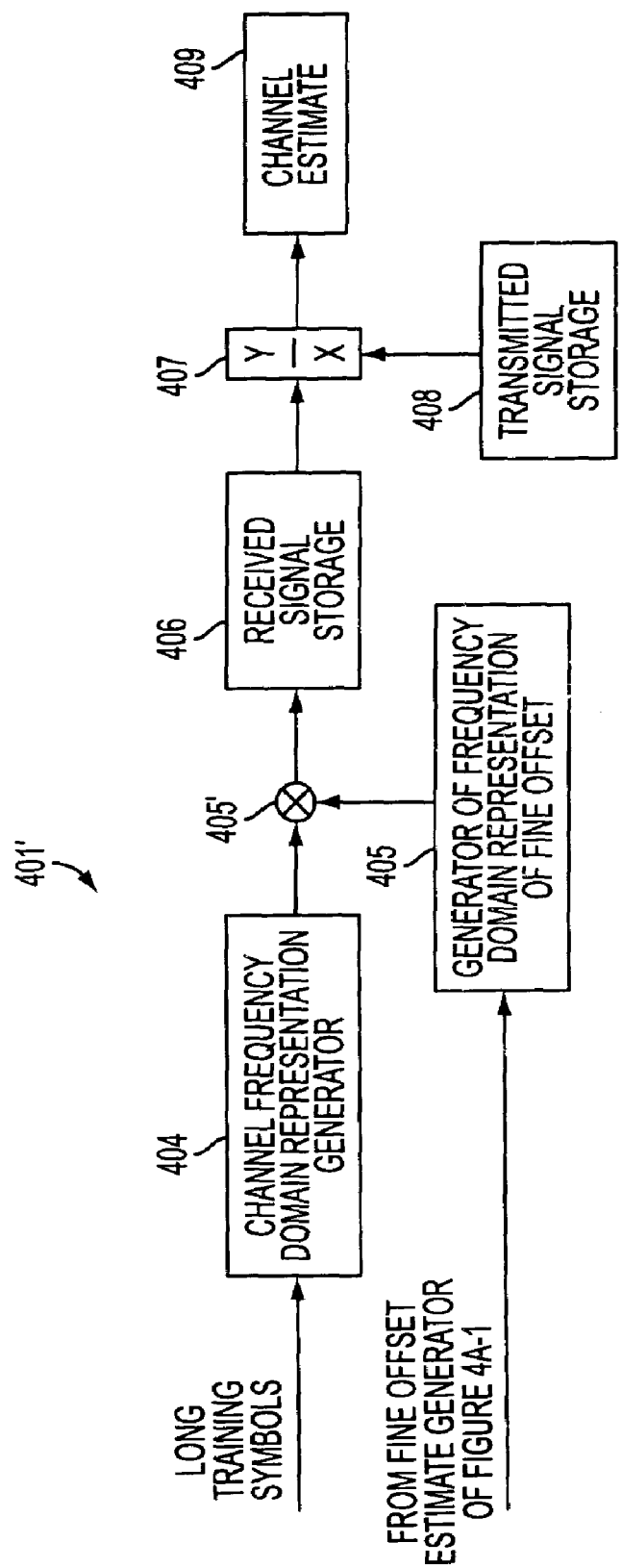

FIG. 4A illustrates a section of a receiver including a fine offset adjustment circuit according to one embodiment of the present invention. Fine offset adjustment circuit 400 includes a fine offset estimate generator 401 that receives the long training symbols and generates a fine offset estimate. Fine offset estimate generator 401, according to one embodiment, is described in greater detail below. Signal generator 402 generates a digital signal having a frequency equal to the fine offset estimate. Mixer 403 multiplies the digital signal with the data symbols received at receiver 400 to compensate for the offset between receiver 400 and a transmitter.

Figure 4B:
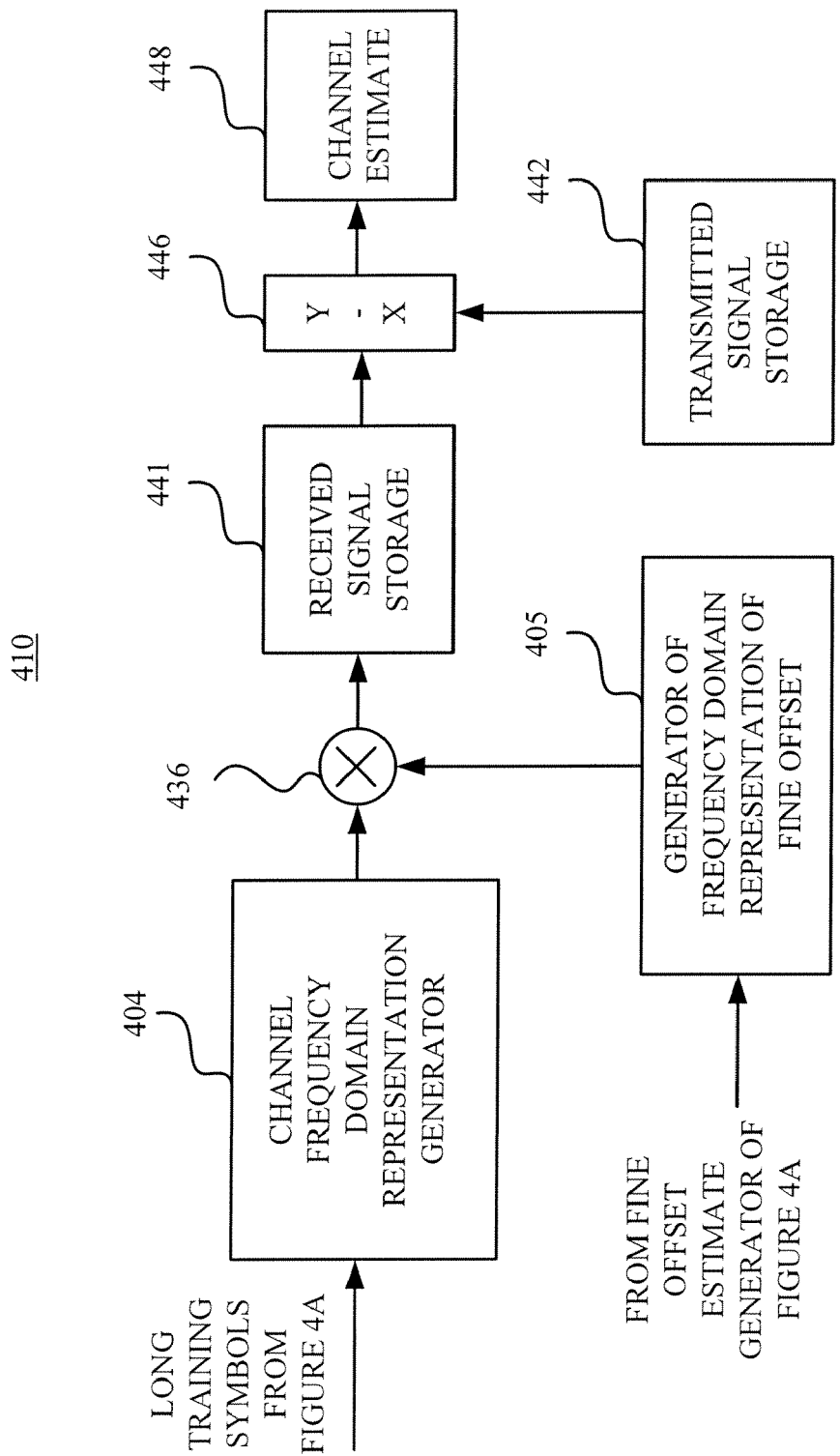
FIG. 4B illustrates a section of a receiver including a channel estimate adjustment circuit according to one embodiment of the present invention.

FIG. 4B illustrates a section of a receiver including a channel estimate adjustment circuit according to one embodiment of the present invention. Channel adjustment circuit 400 includes a channel frequency domain representation generator 404 that receives the long training symbols and generates a channel transfer function in the frequency domain. Generator 405 receives the fine offset estimate and produces a frequency domain representation of a signal having a frequency equal to the fine offset estimate. Convolver 436 convolves 1) the frequency domain representation of the signal with a frequency equal to the fine offset estimate with 2) the frequency domain representation of the channel transfer function. The output of convolver 436 is then stored in memory 441.

In contrast to memory 441, which stores an offset adjusted frequency domain representation of the long symbols as received at receiver 400, memory 442 stores within it a frequency domain representation of the long symbols as they would have been produced at a transmitter for transmission to receiver 400. Division circuit 446 retrieves the offset adjusted frequency domain representation of the long symbols from memory 441 and divides it by memory 442's frequency domain representation of the long symbols as they would have been produced at a transmitter to produce a channel estimate for storage in memory 449. While in the above description memory 442 stores within it a frequency domain representation of the long symbols as they would have been produced at a transmitter, it should be appreciated that in an alternative embodiment memory 442 could store a time domain representation of the long symbols as they would have been produced at a transmitter. In such an alternative embodiment, a fourier transform unit would reside in between memory 442 and divider circuit 446 and would transform the time domain representation in memory 442 into a frequency domain representation suitable for being a divisor in divider circuit 447.

The channel estimate in memory 448 can be retrieved by other circuitry (not shown) and inverted and used to correct the frequency domain representation of data symbols that arrive after the long symbols.

Figure 4C:
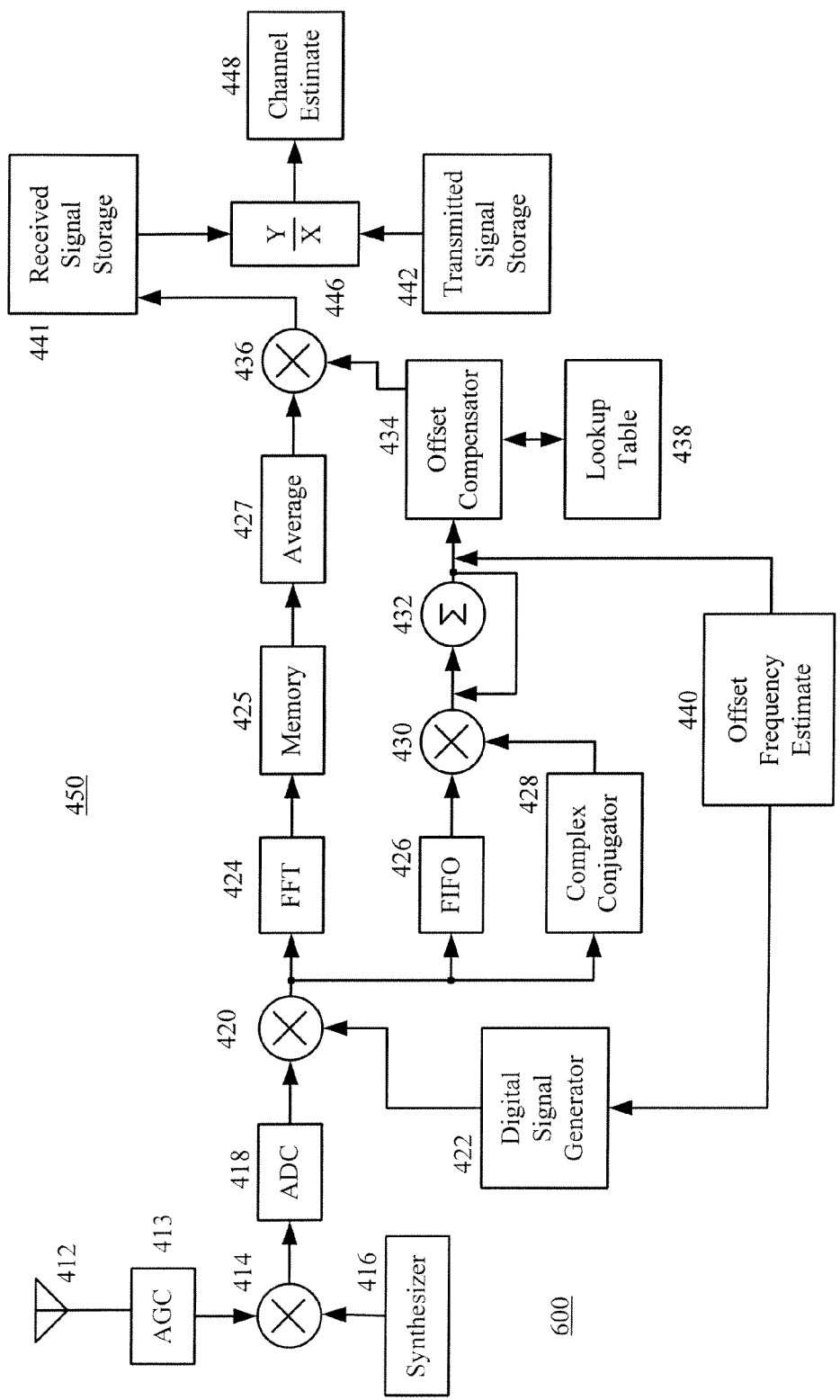
FIG. 4C illustrates a receiver in accordance with an embodiment of the present invention.

FIG. 4C illustrates a receiver 450 in accordance with an embodiment of the present 30 invention. Receiver 450 includes an automatic gain control (AGC) circuit 413, antenna 4i2, an analog mixer 414, a synthesizer 416, and an analog-to-digital converter (ADC) 418. Antenna 412 receives a packet (such as packet 300 described above) in the form of an analog signal transmitted by a transceiver such as transceiver 210' or 220' described above. Since the analog signal is likely to have a varying amplitude, AGC 413 produces at its output a fixed amplitude replica of the analog signal. According to an alternative embodiment, automatic gain control is distributed throughout the gain stages of the RF front end. It should also be appreciated that AGC 413 can be part of a low noise amplifier (LNA) that provides gain control. Depending on the frequency with which transceiver 210' and 220' are communicating, synthesizer 416 produces a synthesizer signal with a frequency such that when the AGC output is multiplied with the synthesizer signal by mixer 4i4, the analog signal is brought down to either baseband or some intermediate frequency (IF). Typically, approximately the first 6 shorts received are used to settle the AGC and are not used to produce a coarse offset estimate of the offset between the synthesizers in the transmitter and the receiver. Depending on the design of the communication system, a certain number of the 10 shorts are not needed to settle AGC 413. The shorts that are not needed for automatic gain control can be used for coarse frequency offset estimation. When the analog signal received includes shorts that are not needed for automatic gain control, mixer 414 produces at its output a replica of the shorts but at baseband or the IF.

ADC 418 samples and digitizes the baseband or IF shorts to produce digital samples of the shorts. According to one embodiment, ADC 418 takes 16 samples of each short symbol, which translates into a rate of 20 million samples/second. In an alternative embodiment, ADC 418 takes 32 samples of each short symbol, which translates into a rate of 40 million samples/second. Digital mixer 420 multiplies the digital samples of the shorts with the output of digital signal generator 422. Since there can be no indication of the offset until a packet is received and analyzed, signal generator 422 initially has as an output a unit vector which has zero frequency.

The output of mixer 420 is also passed to first-in-first-out (FIFO) queue 426. Queue 426 delays the digital samples of the shorts by approximately half of the duration of the shorts that are left after automatic gain control has settled. For example, if 2 shorts are left after automatic gain control has settled, then digital samples of the first short are delayed by the duration of one short. If there are three shorts, then the digital samples of the first short and half of the samples of the second short could be delayed by the duration of one and a half shorts. Alternatively, the samples of the first two shorts of the three shorts could be delayed by the duration of one short and the first and second shorts could be correlated with the second and third shorts. If 4 shorts are left after automatic gain control has settled, then the digital samples of the first two shorts are delayed by the duration of two shorts. Where 2 shorts are left after automatic gain control has settled, the digital samples of the second short are changed to their complex conjugates by complex conjugator 428. As the complex conjugate of each sample of the second short is produced it is multiplied by its corresponding sample from the first short in queue 426 by digital mixer 430. The product of mixer 430 is then summed by integrator 432. Integrator 432's period of integration is equivalent to half the sum of the duration of all the shorts that are left after automatic gain control has settled. So where two (four) shorts are left after automatic gain control has settled, the period of integration is the duration of one (two) short. After all the products produced by mixer 430 have been sunned by integrator 432, the output of integrator 432 is a complex value or vector with an angle which is an estimate indicative of the coarse frequency offset between the synthesizer 416 of transceiver 220' and the synthesizer (not shown) in transceiver 210'. The combination of queue 426, conjugator 428, and mixer 430 acts as a self-correlator or autocorrelator.

Frequency offset estimate generator 440 divides the angle of the vector outputted by integrator 432 by the duration of a short symbol, or more generally the delay of queue 426. Generator 440 produces the difference in frequency between the synthesizer 416 of transceiver 220' and the synthesizer (not shown) in transceiver 210'. This frequency difference between the synthesizers that is generated based upon the correlation of short symbols is referred to as a coarse frequency offset estimate. The frequency difference is passed to signal generator 422 which produces a sinusoid with a frequency equivalent to the frequency difference outputted by generator 440. By having generator 422 produce a sinusoid that has a frequency equal to the offset between the synthesizers, the mismatch between the synthesizers can be compensated for.

After the shorts are correlated and a coarse offset estimate is produced, the long symbols pass through antenna 412 and AGC 413 and arrive at mixer 414 where they are brought down to baseband or an intermediate frequency. According to one embodiment, ADC 418 samples and digitizes the long symbols at the rate of 20 million samples a second to produce 64 samples per long symbol. In an alternative embodiment, ADC 4i8 produces 128 samples per long symbol, which translates into a rate of 40 million samples/second. Mixer 420 multiplies the digital long samples with a digital sinusoid (digital periodic signal) produced by generator 422. Since the sinusoid produced by generator 422 is based on a coarse frequency offset estimate, at the output of mixer 420, the samples that have been adjusted may still have a residual offset.

According to one embodiment, the output of mixer 420 that is due to the first long symbol is passed to a fast fourier transform (FFT) unit which performs a fast fourier transform of the output and stores it in memory 425. Similarly, the output of mixer 420 that is due to the second long symbol is fast fourier transformed and stored in memory 425. Average circuit 427 retrieves the transform of each long symbol and averages them and provides the average of the transforms to convolver 436. According to one embodiment the output of mixer 420 that was due to each long symbol was separately fourier transformed. Additionally, while the output of mixer 420 is fast fourier transformed according to one embodiment, it should be appreciated that other types of transforms (e.g., hilbert transform) known in the art may be used to take a time domain representation of a signal and transform it into a frequency domain representation. Units that perform the time-domain-to-frequency-domain transformation are referred to herein as frequency domain transfer units.

The output of average circuit 427 is a frequency domain representation of the two long symbols as they have been modified by the channel between the two transceivers. As described below, this frequency domain representation of the two long symbols can be used to generate an estimate of the transfer function of the channel (or channel estimate). The channel estimate can be inverted and used to reverse the effect of the channel on the signal transmitted by transceiver 210'. Since the samples which were fast fourier transformed were multiplied by a sinusoid with a frequency based on the coarse offset estimate, the frequency domain representation of the received signal may contain a residual offset. Consequently, the frequency domain representation produced by average circuit 427 cannot be used to produce an accurate representation of the actual channel transfer function until any residual offset is compensated for. Any residual offset can be compensated for after a fine offset estimate is generated using the samples of the long symbols.

To produce a fine offset estimate, the samples of the long symbols produced at the output of ADC 418 must first pass through queue 426 and conjugator 428. Queue 426 delays the digital samples of the first long symbol of the two long symbols by the duration of one long symbol. The digital samples of the second long are changed to their complex conjugates by complex conjugator 428. As the complex conjugate of each sample of the second long is produced it is multiplied by its corresponding sample from queue 426 by digital multiplier 430. The products of multiplier 430 are summed by integrator 432. After all the products produced by multiplier 430 have been summed by integrator 432, the output of integrator 432 is a complex value or vector with an angle which is an estimate indicative of the fine frequency offset between the synthesizers of transceivers 210' and 220'.

Frequency offset estimate generator 440 divides the angle of the vector outputted by integrator 432 by the duration of a long symbol, or more generally the time between the starts of the two longs. Generator 440 produces the residual difference in frequency between the synthesizers in transceiver 210' and transceiver 220'. Since digital long samples were already multiplied by a signal with a frequency based on the coarse offset estimate, the output of generator 440 is the residual frequency difference between the synthesizers in transceivers 210' and 220'. This frequency difference between the synthesizers that is generated based upon the correlation of long symbols is referred to as a fine offset estimate. The fine offset estimate is passed to signal generator 422 which produces a sine wave with a frequency equivalent to the sum of the fine frequency offset estimate and the coarse frequency offset estimate. By having generator 422 produce a sinusoid that has a frequency equal to the residual offset between the synthesizers, the mismatch between the synthesizers can be further compensated for.

As indicated above, since the digital long samples which were fast fourier transformed by FFT unit 424 were multiplied by a signal with a frequency equal to the coarse offset estimate, the frequency domain representation of the received signal may not be a very accurate representation of the actual transmitted signal as transformed by the channel. The inaccuracy is partly due to the presence of a residual frequency offset. The residual frequency offset can be estimated and compensated for using the fine offset estimate. Since the frequency domain representation of the received signal is stored in memory 425, the frequency domain representation of the received signal needs to be convolved by a frequency domain representation of a signal that has a frequency equal to the fine offset estimate, fo. The frequency domain representation of a windowed complex sine wave that is sampled for a finite period of time has the general shape of a sinc function—sin(x)/x. The frequency domain representation of the windowed sine wave varies as a function of fo. According to one embodiment, convolver 436 convolves three samples of the frequency domain representation of a sine wave, with frequency equal to the fine offset estimate, with the frequency domain representation of the received signal stored in memory 425. The three samples of the frequency domain representation of the sine wave with frequency equal to the fo are retrieved from memory 438 by frequency domain compensator 434. In order to perform the convolution as rapidly as possible, memory 438 stores a table that has for various values of fo associated samples of the frequency domain representation of a sine wave with frequency equal to fo. To retrieve the appropriate samples, compensator 434 first calculates the fine offset estimate, fo, based on the output of integrator 432 and then indexes into the table based on fo. In one embodiment, compensator 434 retrieves only the closest entry to fo. In another embodiment, if the calculated fine offset estimate falls between two values of fo in memory 438, compensator 434 retrieves the samples that are associated with the two values. Compensator 434 then interpolates between each sample of one value and the corresponding sample of the other value to produce an interpolated sample value. Compensator 434 then provides the interpolated sample values for the calculated fine offset estimate to convolver 436 which then convolves the interpolated sample values with the frequency domain representation of the long symbols as modified by the channel. The output of convolver 436 is a frequency domain representation of the long symbols as received at the receiver and as adjusted for frequency offset between the transmitter and receiver. The output of convolver 436 is then stored in memory 441.

In contrast to memory 441, which stores an offset adjusted frequency domain representation of the long symbols as received at receiver 450, memory 442 stores within it a frequency domain representation of the long symbols as they would have been produced at transceiver 210' for transmission to receiver 450. Circuit 446 retrieves the offset adjusted frequency domain representation of the long symbols from memory 441 and divides it by memory 442's frequency domain representation of the long symbols as they would have been produced at transceiver 210' to produce a channel estimate for storage in memory 448. While in the above description memory 442 stores within it a frequency domain representation of the long symbols as they would have been produced at transceiver 210', it should be appreciated that in an alternative embodiment memory 442 could store a time domain representation of the long symbols as they would have been produced at transceiver 210'. In such an alternative embodiment, a fourier transform unit would reside in between memory 442 and circuit 446 and would transform the time domain representation in memory 442 into a frequency domain representation suitable for being a divisor in circuit 446.

The channel estimate in memory 448 can be retrieved by other circuitry (not shown) and inverted and used to correct the frequency domain representation of data symbols that arrive after the long symbols.

While in the above description offset compensator 434 retrieves from memory 438 three samples of the frequency domain representation of a sinusoid with frequency equivalent to the fine offset estimate, in an alternative embodiment, compensator 434 stores an equation for each of the samples. The equation describes how the complex values of the sample varies as a function of the fine offset estimate. After compensator 434 calculates the fine offset estimate, compensator 434 evaluates each sample's equation to determine each sample's value for the calculated fine offset estimate. Compensator 434 then supplies the sample values to convolver 436 which convolves them with frequency domain representation of the received signal stored in memory 425.

While in the above description lookup table 438 stores only three sample values for each fine offset estimate value, it should be appreciated that the actual number of sample values stored for each fine offset estimate value can be a number other than three and is dependent on design considerations. Similarly, while in the above description three equations are stored in compensator 434, it should be appreciated that the actual number of equations is a design consideration and may not be three, but equal to the number of samples that are needed.

Figure 5:
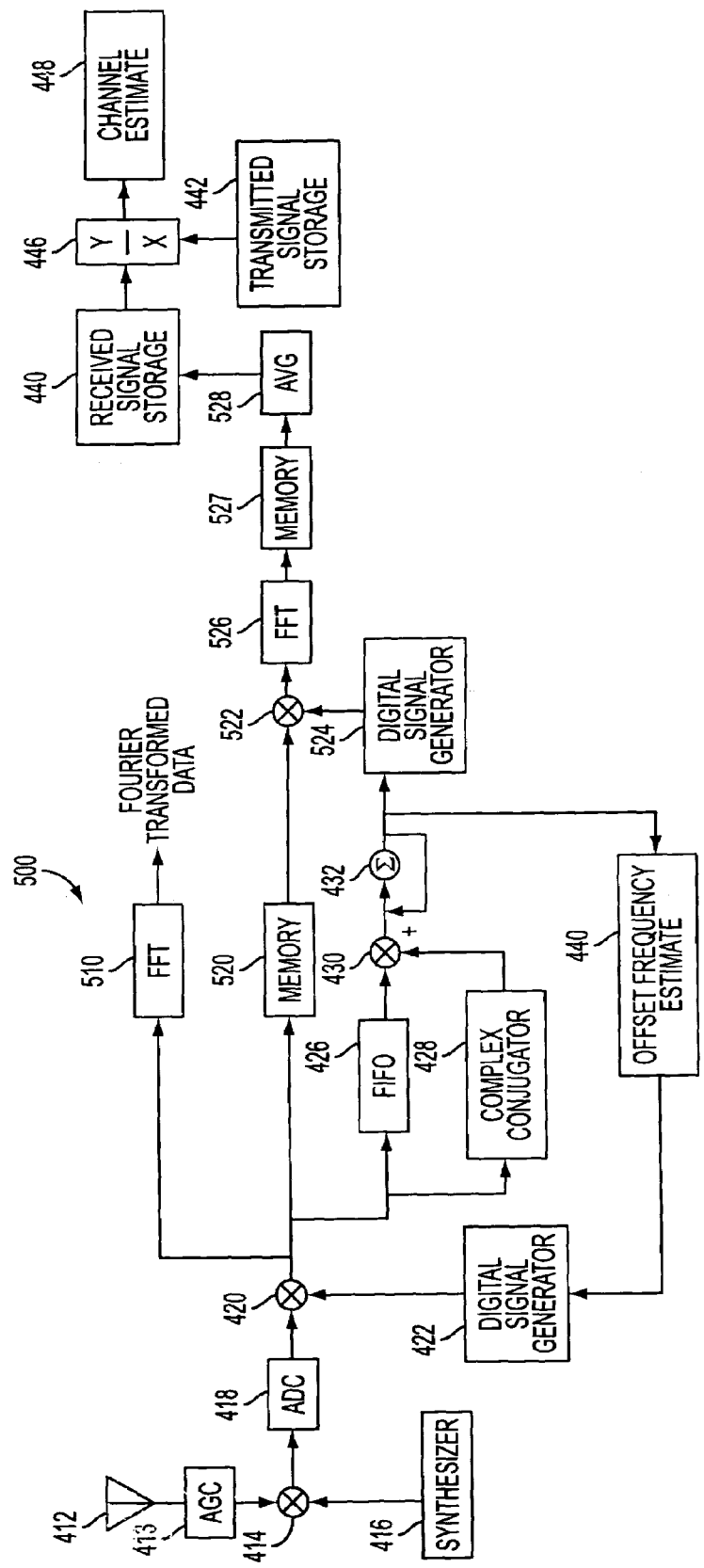
FIG. 5 illustrates a receiver in accordance with an alternative embodiment according to the present invention.

FIG. 5 illustrates a receiver 500 in accordance with an alternative embodiment according to the present invention. Receiver 500 operates in the manner that is similar to receiver 450. Consequently, it is not necessary to repeat the description of the operation of most of the elements. The difference between receiver 500 and receiver 450 lies in the manner in which a channel estimate is performed. Rather than fourier transforming the output of mixer 420, the output of mixer 420 that is due to the long symbol samples (coarse offset adjusted long symbol samples) is stored in memory 520 until integrator 432 has produced a vector with an angle which is an estimate indicative of the fine offset between the synthesizers of transceivers 210' and 220'. When integrator 432 produces an angle which is an estimate indicative of the fine offset, signal generator 524 calculates the fine offset estimate by dividing the angle by the duration of a long symbol, or more generally the duration of the integration by integrator 432. Signal generator 524 then generates a digital sinusoid with a frequency equal to the fine offset estimate. Mixer 522 retrieves from memory 520 the coarse offset adjusted long symbol samples of the first long symbol and multiplies them with a digital sinusoid produced by generator 524. The output of mixer 522 is then fourier transformed by FFT unit 526, and the output of FFT unit 526 is stored in memory 527. Mixer 522 then retrieves from memory 520 the coarse offset adjusted long symbol samples of the second long symbol and multiplies them with the digital sinusoid produced by generator 524. The output of mixer 522 is then fourier transformed by FFT unit 526, and the output of FFT unit 526 is stored in memory 527. Average circuitry 528 retrieves the transforms of each offset adjusted long symbol, averages the transforms, and stores the average in memory 440.

According to one embodiment, units 510 and 526 are the same unit. Once the coarse and fine offsets have been calculated, FFT unit 510 produces at its output fourier transformed representations of data symbols and guard intervals. The output of unit 510 is used, in embodiments described below, to provide updated estimates of the offset between the receiver and transmitter.

The description given above in connection with FIG. 4C including the alternative embodiments also applies to FIG. 5, and need not be repeated here.

Figure 6:
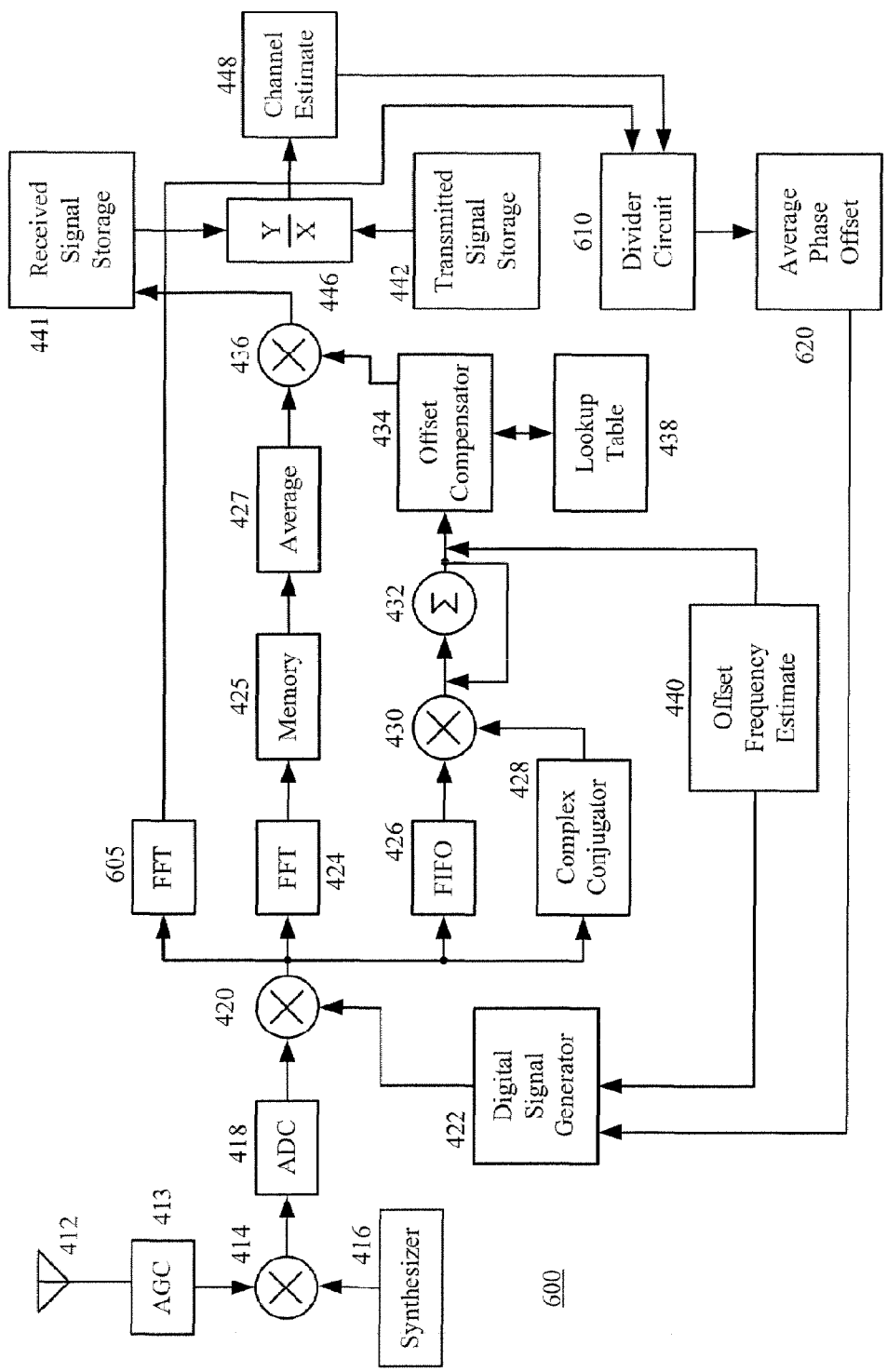
FIG. 6 illustrates a circuit for updating the frequency offset according to an alternative embodiment of the present invention.

In the above description, the frequency offset was estimated by auto-correlating either the long or short symbols. The frequency offset can also be updated during receipt of the data symbols. During receipt of the data symbols, the frequency offset between the transceivers can be estimated again by estimating the difference between the phase of the pilot carriers in a data symbol and the phase of the pilot carriers during the long symbols. FIG. 6 illustrates a circuit 600 for updating the frequency offset according to an alternative embodiment of the present invention. In circuit 600, the divider circuit 610 receives the output of FFT unit 605 and the output of memory 448 that stores the channel estimate. FFT unit 605 produces a frequency domain representation of a received data symbol. Divider circuit 610 divides the output of FFT unit 605 by the channel estimate.

According to one embodiment, the output of unit 605 is 64 samples of the frequency domain representation of the received data symbol. In an alternative embodiment, the output of unit 605 is 128 samples of the frequency domain representation of the received signal. It should be appreciated that the number of samples is a design consideration and can be tied to the number of samples produced for each long timing symbol by ADC 418. In the embodiment where unit 605 produces 64 samples, the samples represent a frequency band extending from −10 MHz to +10 MHz. Since only 16.5 MHz is used for transmitting data, there are 52 samples that represent data transmission and the remaining samples simply represent a guard band between the 20 MHz wide channels of an 802.11a standard compliant system. In the case of 128 samples, the outer 64 are adjacent channels. The 52 samples represent 52 carriers of which four are pilot carriers which are used to monitor signal strength and carrier phase. According to one embodiment, the ±7 and ±21 samples are samples of pilot carriers. When circuit 610 divides the 64 samples of the frequency domain representation of the received data symbol by the channel estimate, the phase of the quotient for the samples at which a pilot carrier is present is indicative of the difference between the phase in a pilot carrier of the data symbol and the phase in the corresponding pilot carrier in the long symbols. Average offset circuit 620 selects the quotients for the samples at which a pilot carrier is present and determines the average phase difference by adding up the phase difference for each of the pilot carriers and dividing the sum by the number of pilot carriers, which is four according to one embodiment.

According to one embodiment, if the magnitude of the smallest pilot carrier is less than one eighth of the magnitude of the largest pilot carrier, the quotient phase of the smallest pilot carrier is not included in determining the average phase difference. Rather, circuit 620 throws out the angle of the smallest pilot carrier and derives a replacement angle using linear interpolation and the angles of the quotients of the two nearest pilot carrier neighbors. The average phase difference is then derived by adding up the phase difference for each of the pilot carriers, including the replacement angle for the smallest quotient, and dividing the sum by the number of pilot carriers, which is four according to one embodiment.

After determining the average phase difference, circuit 620 divides the difference by the time elapsed since the fine offset estimate was calculated to determine an updated frequency offset which is a measure of the frequency offset that remains between the transceivers even after correction using the coarse and fine offset estimates. The updated frequency offset is then applied to digital signal generator produces a digital sinusoid to correct for the frequency mismatch between the transmitter and receiver. The frequency of the sinusoid is the sum of the updated frequency offset and the coarse and fine offset estimates.

It should be appreciated that updating the frequency offset by determining the phase difference between the pilots in the channel estimate and the pilots in a data symbol as just described in connection with FIG. 6 can also be used in the embodiment described in connection with FIG. 5. In such an embodiment, divider circuit 610 would accept the output of FFT unit 510 and the channel estimate from memory 448.

Figure 7:
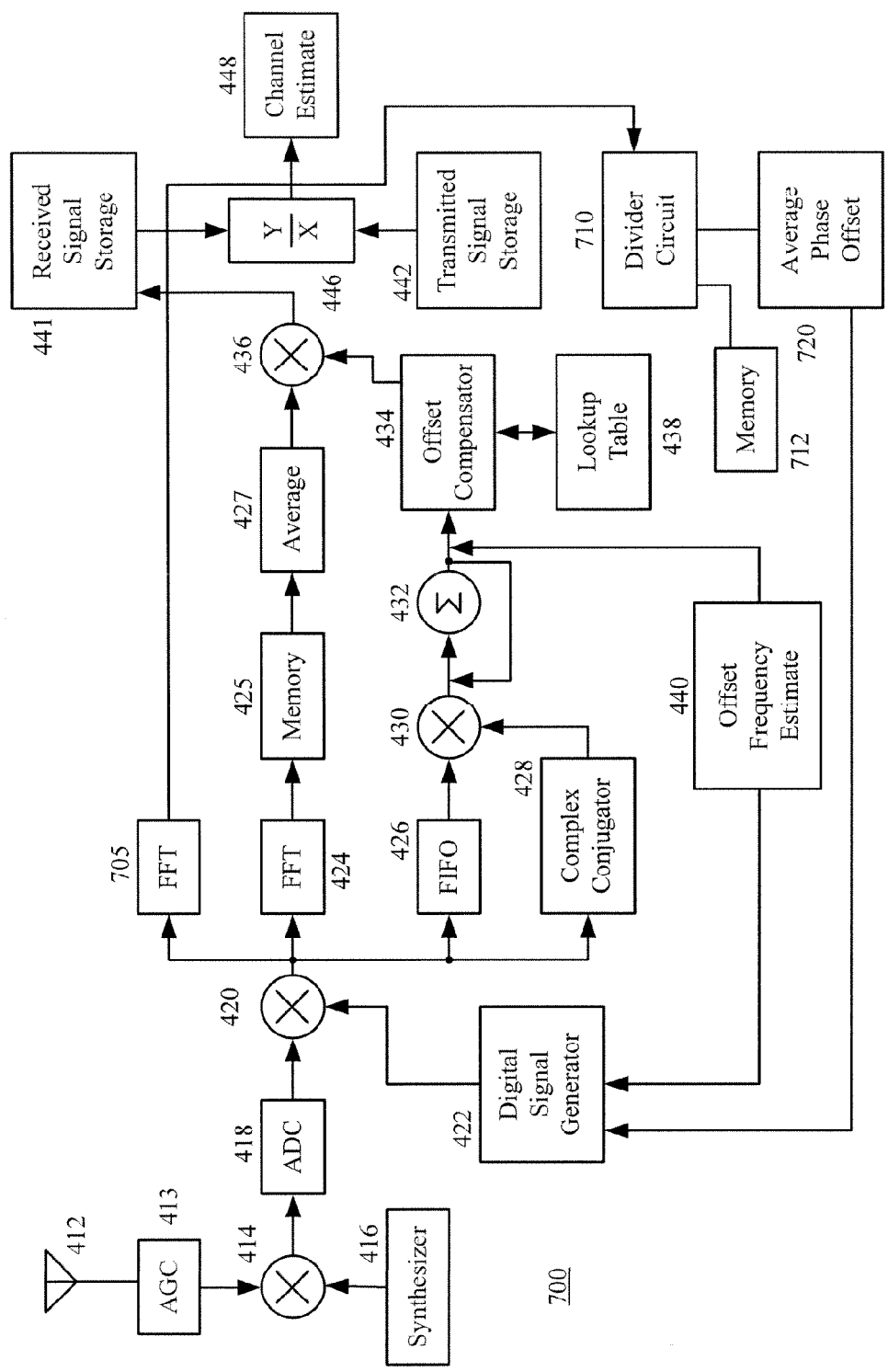
FIG. 7 illustrates a circuit for updating the frequency offset according to yet another alternative embodiment of the present invention.

The frequency offset can also be updated by measuring the difference in the phase of a pilot channel in two data symbols or by measuring the difference in phase between the terminal portion of a data symbol and the data symbol's cyclic prefix (or guard interval). The phase difference in a pilot channel in two data symbols divided by the time elapsed between the two data symbols is a measure of the frequency offset between the transceivers. Similarly, the phase difference between the terminal portion of a data symbol and its cyclic prefix divided by the time elapsed between the two is a measure of the frequency offset between the transceivers, FIG. 7 illustrates a circuit 700 for updating the frequency offset according to yet another alternative embodiment of the present invention. While circuit 700 will be described in terms of calculating the frequency offset, by estimating the phase difference in a pilot channel in two data symbols, it should be appreciated that circuit 700 can also be used to estimate the phase difference between a terminal portion of a data symbol and the symbol's guard interval. In circuit 700, the divider circuit 710 receives the output of unit 705 that is due to a data symbol at time $T_0$ and stores the output in memory 712. At some time $T_0 + \Delta t$, where $\Delta t$ is equal to an integer multiple of the duration of a data symbol, divider circuit 710 accepts the output of unit 705 that is due to another data symbol and stores the output in memory 712. Unit 705 produces a frequency domain representation of the received signal. divider circuit 710 divides the frequency domain representation of the first data symbol that is stored in memory 712 by the frequency domain representation of the second data symbol.

According to one embodiment, the output of convolver 436 is 64 samples of the frequency domain representation of a data symbol. In an alternative embodiment, the output of unit 705 is 128 samples of the frequency domain representation of the received signal. It should be appreciated that the number of samples is a design consideration and can be tied to the number of samples produced by ADC 418 per long timing symbol. In the embodiment where convolver 436 produces 64 samples, the samples represent a frequency band extending from −10 MHz to +10 MHz. Since only 16.5 MHz of the 20 MHz is used for transmitting data, there are 52 samples that represent data transmission and the remaining samples simply represent a guard band between the 20 MHz wide channels of an 802.11a standard compliant system. The 52 samples represent 52 carriers of which four are pilot carriers which are used to monitor signal strength. According to one embodiment, the ±7 and ±21 samples are samples of pilot carriers. When circuit 710 divides the 64 samples of the frequency domain representation of the first data symbol stored in memory 712 by frequency domain representation of the second data symbol, the phase of the quotient for the samples at which a pilot carrier is present is indicative of the difference between the phase in a pilot carrier of the first data symbol and the phase in the corresponding pilot carrier in the second data symbol. Average offset circuit 720 selects the quotients for the samples at which a pilot carrier is present and determines the average phase difference by adding up the phase difference for each of the pilot carriers and dividing the sum by the number of pilot carriers, which is four according to one embodiment.

According to one embodiment, if the magnitude of the smallest quotient of a pilot carrier is less than one eighth of the magnitude of the largest pilot carrier, the phase of the smallest quotient of a pilot carrier is not included in determining the average phase difference. Rather, circuit 720 throws out the angle of the smallest pilot and derives a replacement angle using linear interpolation and the angles of the quotients of the two nearest pilot carrier neighbors. The average phase difference is then derived by adding up the phase difference for each of the pilot carriers, including the replacement angle for the smallest quotient, and dividing the sum by the number of pilot carriers, which is four according to one embodiment.

After determining the average phase difference, circuit 720 divides the difference by the time elapsed between the receipt of the two data symbols at the antenna 412 to determine the measure of the frequency offset between the transceivers. This updated frequency offset is then applied to digital signal generator 422 which adds the updated frequency offset to the coarse and fine offsets and produces a digital sinusoid to correct for the frequency mismatch between the transmitter and receiver.

It should be appreciated that updating the frequency offset by determining the phase difference between the pilots in two different data symbols as just described in connection with FIG. 7 can also be used in the embodiment described in connection with FIG. 5. In such an embodiment, divider circuit 710 would accept the output of FFT unit 510.

Figure 8:
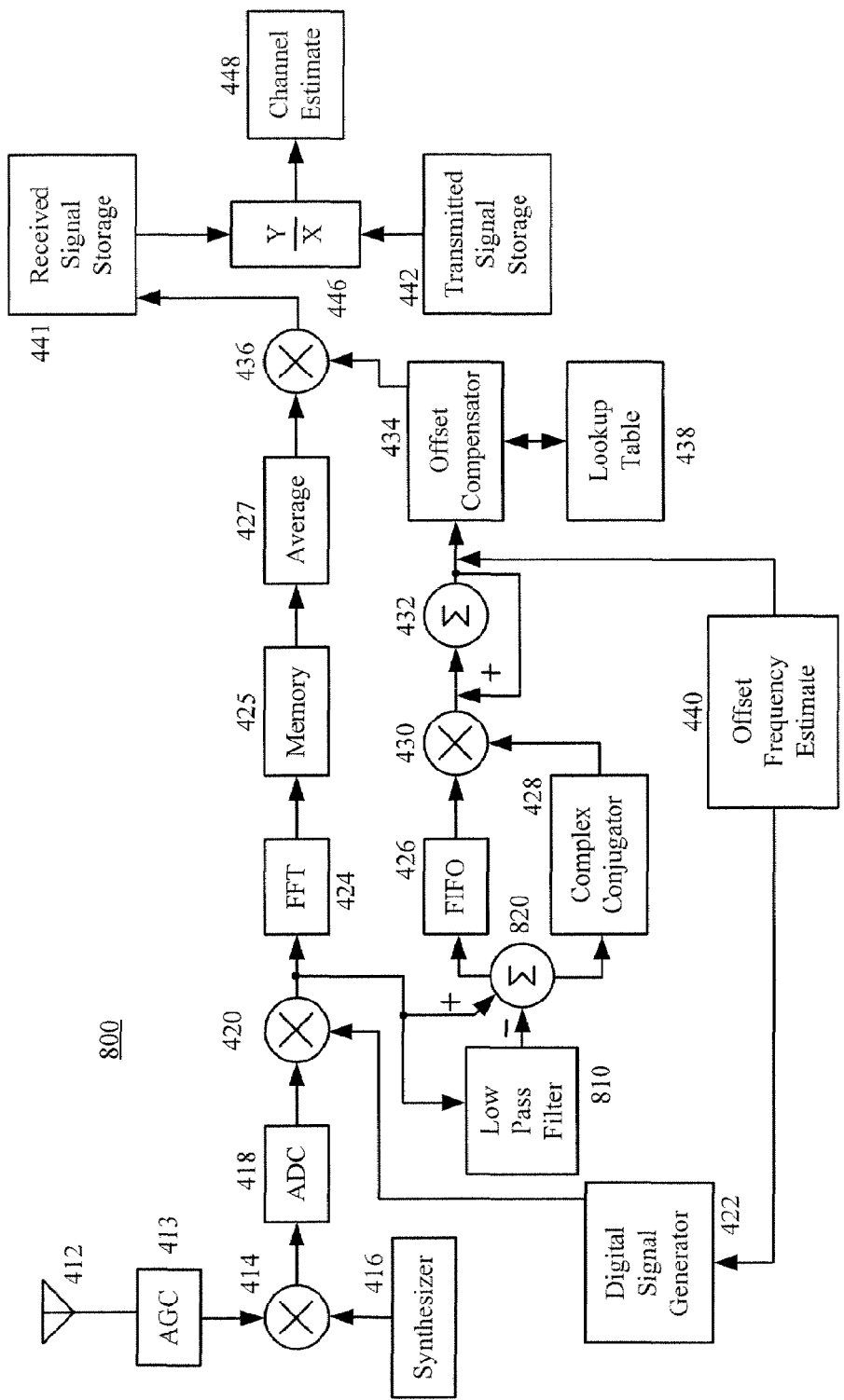
FIG. 8 illustrates a receiver according to yet another alternative embodiment in accordance with the present invention.

FIG. 8 illustrates a receiver 800 according to yet another alternative embodiment in accordance with the present invention. Receiver 800 operates in the manner that is similar to receiver 450. Consequently it is not necessary to repeat the description of the operation of most of the elements. The difference between receiver 800 and receiver 450 lies in the enhancement in receiver 800 which allows the coarse and fine frequency offsets to be determined more accurately. Receiver 800's enhancement is a filter 810 for removing the DC offset in the samples that emerge from mixer 420. According to one embodiment, filter 810 is a low-pass infinite impulse response (IIR) filter, but alternative embodiments may have a different type of filter. Integrator 820 sums the low-pass filtered samples that emerge from filter 810 with the samples that emerge from mixer 420. Since the DC component of the samples is removed, the angles that emerge from integrator 432 are more accurate. Consequently, the fine and coarse offset estimates are more accurate.

An alternative way to compensate for the DC present in the signal is to calculate the DC offset present in the shorts and the longs. Since there is a carrier frequency offset between the transmitter and the receiver, the DC offset introduced by the receive chain is not at the DC of the transmitted OFDM signal spectrum. If this carrier frequency offset is corrected before the DC offset correction, then the receiver DC offset will be moved to the frequency with an opposite sign of the carrier frequency offset. For example, an uncertainty of 40 parts per million (ppm) in a carrier whose frequency is 5.25 GHz corresponds to an offset of 210 KHz, about ⅔ of the frequency separation between carriers.

Figure 1A:
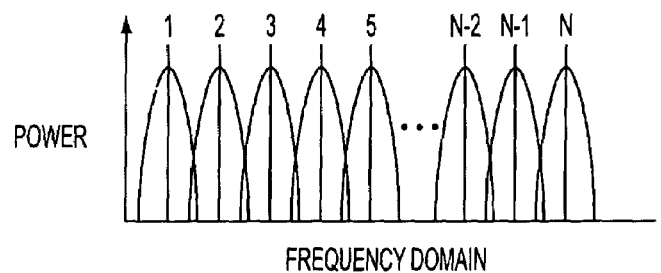
FIG. 1A illustrates the frequency spectrum of multiple modulated subcarriers in an OFDM system.
Figure 1B:
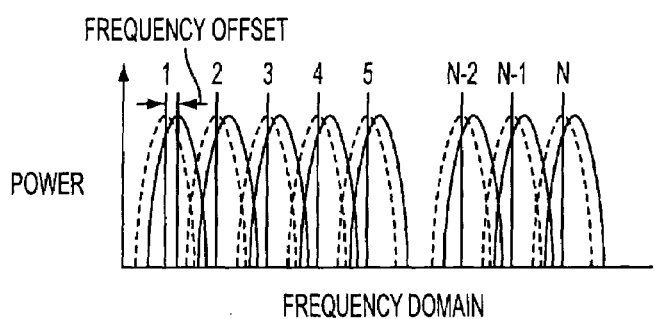
FIG. 1B illustrates the effect of the lack of synchronization on the frequency spectrum of multiple subcarriers.
Figure 9:
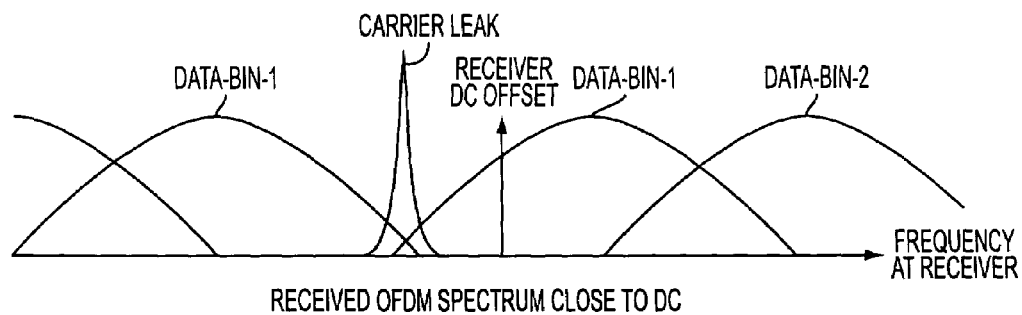
FIG. 9 shows the spectrum of received 802.11a OFDM symbols, including carrier leak, and a receiver's DC offset.

FIG. 9 shows the spectrum of received 802.11a OFDM symbols, including carrier leak, and a receiver's DC offset. As shown in FIG. 9, for any non-zero frequency offset, the receiver DC offset would contain contributions from nearby data bins. The DC offset estimation would have been easier if the transmitted signal spectrum indeed had a zero DC, as implied in the 802.11a standard's OFDM modulation. However, there is always a certain amount of carrier leak from the power amplifier at the carrier frequency, which translates to the DC bin after down conversion, and therefore the DC in the transmitted signal spectrum is not exactly zero. According to the 802.11a standard, the power of the carrier leak can be as high as 15 dB below the signal power. Assuming each of the data carriers has about the same amount of power, the power of the carrier leak can actually be higher than the power of each data carrier (−15 dB>1/52), and therefore cannot be ignored.

According to one implementation, the receiver DC offset can be as large as +/−100 mV. Since, according to one embodiment, the full range of ADC 418 is from −500 mV to 500 mV, the power of the DC offset can be significantly higher than the power of one data carrier.

Most DC offset algorithms use filters. However, since there are typically only 4×32=128 samples left in the shorts, the bandwidth of the filter cannot be very narrow. As shown in FIG. 9, any filtering operation with a bandwidth larger than the carrier frequency offset would pass both the carrier leak and the DC offset, and therefore cannot be an accurate DC offset estimator. To separate the DC offset from the rest of the signal spectrum, we have to rely on the fact that the carrier leak is in frequency lock with the data carriers, while the DC offset is plainly a signal added in at the receiver.

Figure 10:
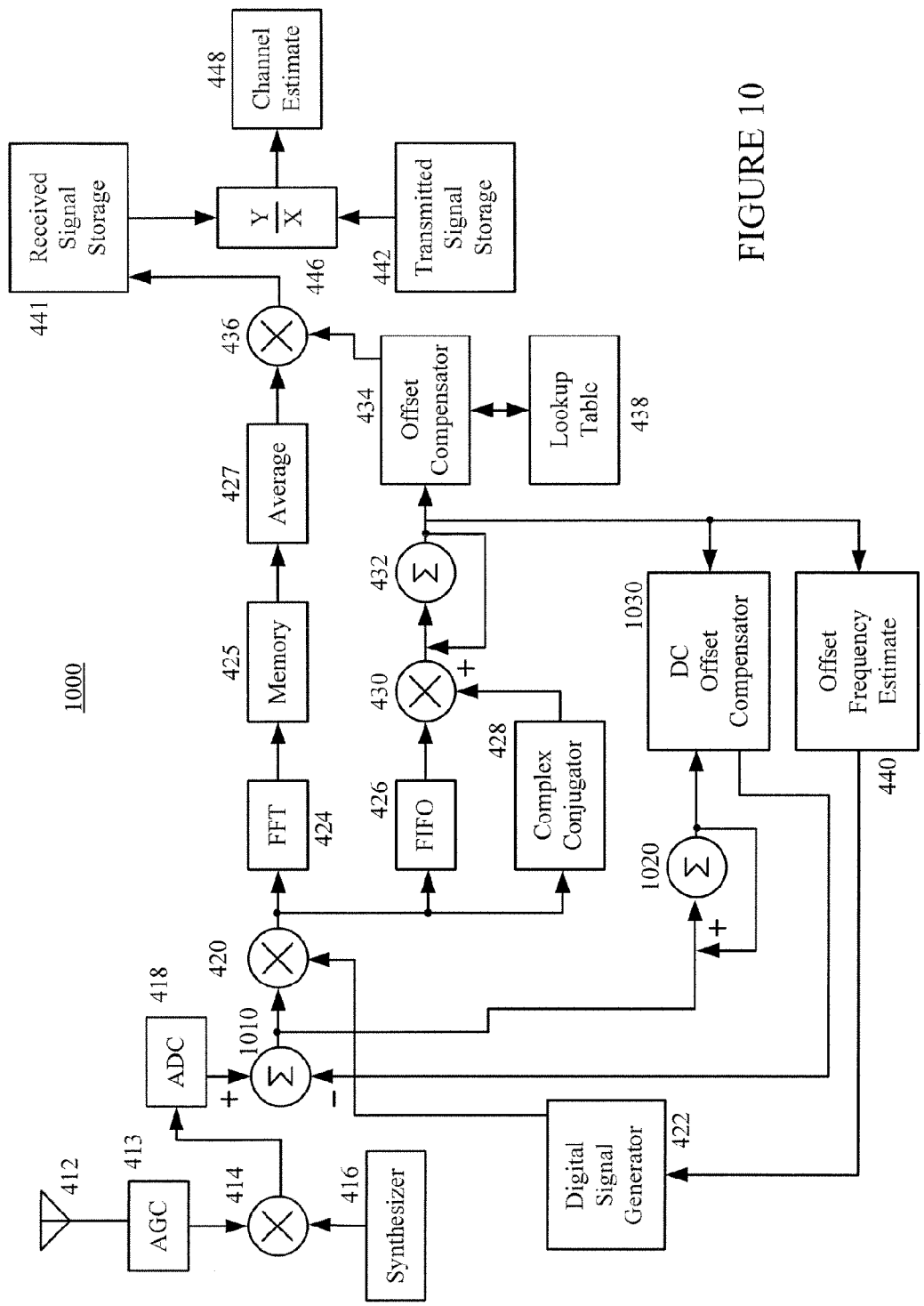
FIG. 10 illustrates a receiver according to yet another alternative embodiment in accordance with the present invention.

FIG. 10 illustrates a receiver 1000 according to yet another alternative embodiment in accordance with the present invention. Receiver 1000 operates in the manner that is similar to receiver 450. Consequently it is not necessary to repeat the description of the operation of most of the elements. The difference between receiver 1000 and receiver 450 lies in the enhancement in receiver 1000 that allows the fine frequency offset to be determined more accurately. Receiver 1000's enhancement is additional circuitry for determining the DC offset. Receiver 1000 separates the receiver DC offset from the transmitted spectrum, by taking two snapshots of the same transmitted symbol and calculating the DC offset from the difference of these two snapshots. Since the shorts are a repetitive sequence of the same symbol, two shorts are used to calculate the DC offset. If AGC 413 completes its operation quickly without taking up too many short symbols, the remaining short symbols can be used for a more accurate estimation. According to one embodiment, 2 short symbols are used for coarse DC offset calculation based on the coarse symbol timing. It should be appreciated that the number of short symbols used for DC offset calculation is design dependent and that the invention encompasses using a number of short symbols other than 2.

If the coarse frequency offset is known, the phase difference, $\alpha$, between 32 samples (or 64 samples if 4 short symbols are available) can be calculated. The sign of $\alpha$ is defined such that if the transmitter carrier frequency is higher than receiver carrier frequency, $\alpha$ is positive. This factor will be used to correct the DC offset calculation at the end of the short symbols. If there is a non-zero frequency offset, the transmitted signal spectrum will rotate, as compared to the DC offset introduced at the receiver, by this amount of phase for every 32 samples. If the two short symbols are accumulated separately and referred to as x1 and x2, then the DC offset can be calculated as follows:

$$DC\ \text{offset} = \frac{(x1-x2)e^{(j\alpha)}}{32(1-e^{(j\alpha)})} \qquad \text{(Equation 2)}$$

Receiver 1000 includes an integrator 1010 that subtracts out the DC offset from symbols that 5 are received after the short symbols used for DC offset measurement are received. Since the DC offset cannot be measured until the short symbols have been received and used to determine the coarse frequency offset, according to one embodiment, integrator 1010 allows the samples of the short symbols to pass unaffected. In the event only two shorts can be used for DC offset calculation, integrator 1020 accumulates the samples of the first short symbol (or the first two short symbols where four shorts are used for DC offset calculation) and provides the sum to DC offset compensator 1030. Integrator 1020 then accumulates the samples of the second short symbol (or the last two short symbols where four shorts are used for DC offset calculation) and provides the sum to compensator 1030. When integrator 432 has produced the coarse offset estimate as described above in connection with FIG. 4C, compensator 1030 evaluates equation 2 above to determine the DC offset. The DC offset evaluated using equation 2 is more accurate when the frequency offset is large, so that $(1-e^{j\alpha})$ will not be a very small number in the denominator, than when the frequency offset is small. If the frequency offset is actually very small, in which case $(1-e^{j\alpha})$ will be very close to zero, the above equation would incur too much of noise enhancement to be useful. If the frequency offset is indeed very small, the filtering technique described in connection with FIG. 8 would work just fine as the carrier leak should be considered as part of the DC offset (they overlap in the frequency spectrum).

Since the coarse offset is available at the end of the shorts, compensator 1030 either uses the above equation and the coarse offset to determine the DC offset, when the frequency offset is relatively large, or compensator 1030 simply uses (x1+x2)/64 (Equation 3) to calculate the DC offset, when the frequency offset is small.

A fine DC offset estimate can be calculated when more than two short symbols are available for DC offset estimation. In an alternative embodiment, samples from four short symbols are used for fine DC offset estimation.

Figures 11A, 11B:
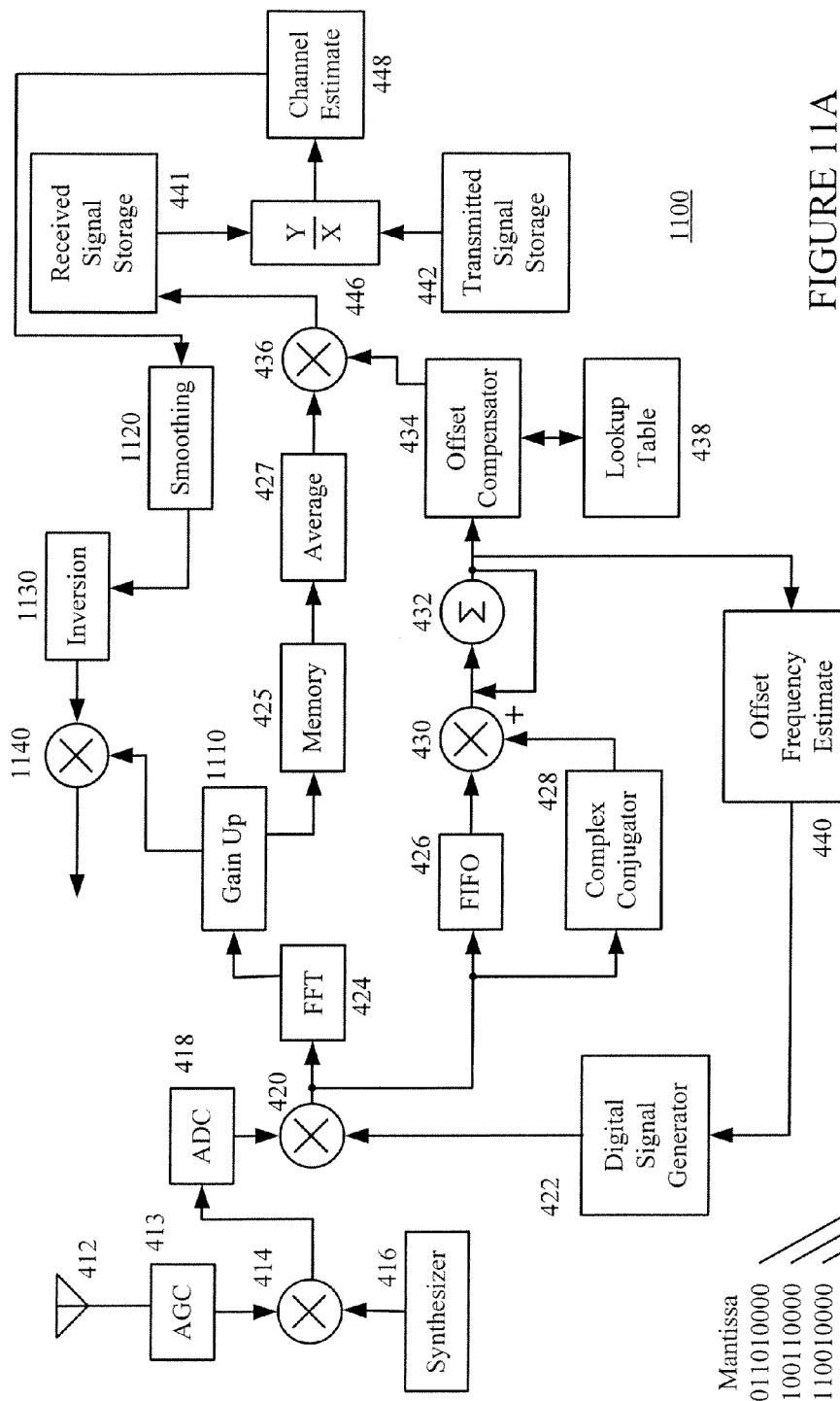
FIG. 11A illustrates a receiver according to yet another alternative embodiment in accordance with the present invention.
FIG. 11B illustrates numbers represented in block floating point format.

FIG. 11A illustrates a receiver 1100 according to yet another embodiment of the present invention. Receiver 1100 operates in a manner similar to receiver 450. Consequently, the operation of most of the elements need not be repeated here. Receiver 1100 is able to produce relatively more accurate channel estimates because it has a gain up circuit 1110 that changes the output of FFT unit 424 50 that loss of information in the output due to later operations such as smoothing and inversion is minimized. According to one embodiment, unit 424 produces values in a block floating point format. The block floating point format provides some of the benefits of floating point format, but with less overhead by scaling blocks of numbers rather than each individual number. FIG. 11B illustrates numbers represented in block floating point format. In block floating point format, a block of numbers (i.e., several mantissas) share one exponent. Assuming the output of unit 424 is due to receipt of the first long symbol at the receiver, unit 424 puts out numbers which are the frequency domain representation of the long symbol and which are formatted in accordance with the block floating point format. The number of bits in the mantissa and exponents is a design consideration, and the present invention encompasses many different combinations. For purposes of illustration only, according to one embodiment, the mantissa is 16 bits long and the exponent is 4 bits long. According to one embodiment, adders and multipliers which perform operations on the 16-bit numbers use 17 bit registers for the mantissas and 5 bit registers for the exponents. Since, in performing computations, it is desirable for purposes of minimizing loss of information to use as much of the word length of the registers as possible without causing an overflow, if the numbers produced by unit 424 are relatively small it is beneficial to have them scaled so that they use as much of the word length as possible. The amount of scaling is dependent upon how much 'headroom' is needed in order to avoid overflow. For example, if mantissas are 16-bits long, numbers are scaled up to the 14th bit, with two bits left for headroom.

Figure 12:
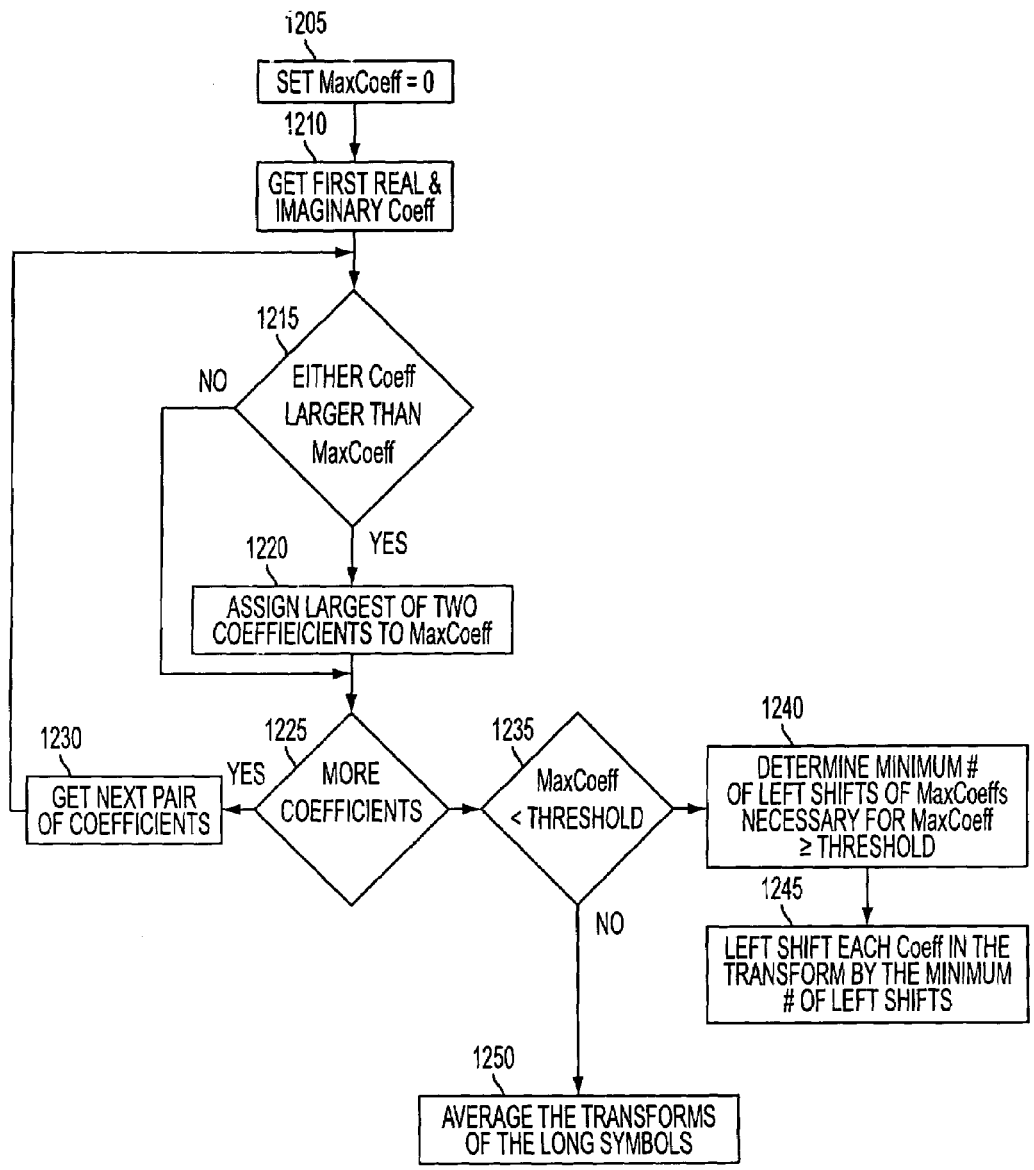
FIG. 12 illustrates a process by which a frequency domain representation is adjusted to minimize loss of information due to subsequent operations on the representation.

FIG. 12 illustrates a process 1200 for scaling a frequency domain representation of a signal to minimize loss of information. According to one embodiment, gain up circuit 1110 performs a process such as process 1200. Gain up circuit 1110 sets (1205) variable MaxCoeff to 0. Circuit 1110 then retrieves (1210) from memory (not shown) the first real and imaginary coefficients that it received from unit 424, and examines (1215) the size of each of the coefficients to determine if either is greater than MaxCoeff. If either is larger than MaxCoeff, circuit 1110 assigns (1220) the larger of the two coefficients to MaxCoeff. Circuit 1110 then determines (1125) whether more coefficients are to be retrieved from unit 424. If there are more coefficients to be retrieved from unit 424, circuit 1110 retrieves (1230) the next pair of coefficients and returns to determine (1215) whether either of the coefficients is greater than MaxCoeff. If there are no more coefficients, circuit 1110 determines (1235) whether MaxCoeff is greater than a threshold that has been selected so that numbers can be properly represented by the registers during calculations involving the numbers. According to one embodiment, the threshold is the number which has the 14th bit set, or 16,384. If MaxCoeff is less than the threshold, circuit 1110 determines (1240) the minimum numbers of left shifts of MaxCoeff that will make MaxCoeff greater than or equal to the threshold. After determining the minimum number of left shifts, circuit 1110 left shifts (1245) each coefficient received from unit 424 by the minimum number of left shifts and adjusts the exponent of the block to reflect that the coefficients have been left shifted. If MaxCoeff is greater than the threshold, circuit 1110 provides (1250) the coefficients received from unit 424 to averaging circuit 425. Alternatively, the largest most significant bit position of the coefficients can be determined, and depending on how it compares to the threshold, the exponent of the block may be adjusted and the coefficients left shifted.

After averaging circuit 425 receives the transforms for the two long symbols, it averages the transforms and provides the average to convolver 436. As described above in connection with FIG. 4, convolver 436 convolves the average of the transforms with a frequency domain representation of a sinusoid in order to minimize the effect of any residual offset. The operation of circuit 1100 from received signal storage 440 up to memory 448 is as described above and need not be repeated.

After the channel estimate arrives at memory 448, smoothing circuit 1120 retrieves the channel estimate from memory 448 and smoothes it using a finite-impulse response (FIR) filter which has seven taps according to one embodiment, but other numbers of taps are also possible and are design dependent. The smoothing lessens the effect of noise on the values of the channel estimate. Inversion circuit 1130 then inverts the smoothed channel estimate and stores the inverted and smoothed channel estimate until the frequency domain representation of a data symbol arrives at multiplier 1140.

Before samples of a data symbol can arrive at multiplier 1140 they first have to reach unit 424. The operation of the elements between antenna 4i2 and multiplier 420, which produces a digital time domain representation of a data symbol at baseband or IF, is as described above in connection with FIG. 4 and need not be repeated here. Unit 424 fourier transforms the offset corrected digital time domain representation of a data symbol after it emerges from multiplier 420. Gain up circuit 1110 scales the frequency domain representation of the data symbol in the manner that scaling is described above in connection with FIG. 12. Multiplier 1140 multiplies the scaled frequency domain representation of the data symbol with the inverted and smoothed channel estimate from circuit 1120 to produce a frequency domain representation of the data symbol which equalizes the effect of the channel.

Figure 13:
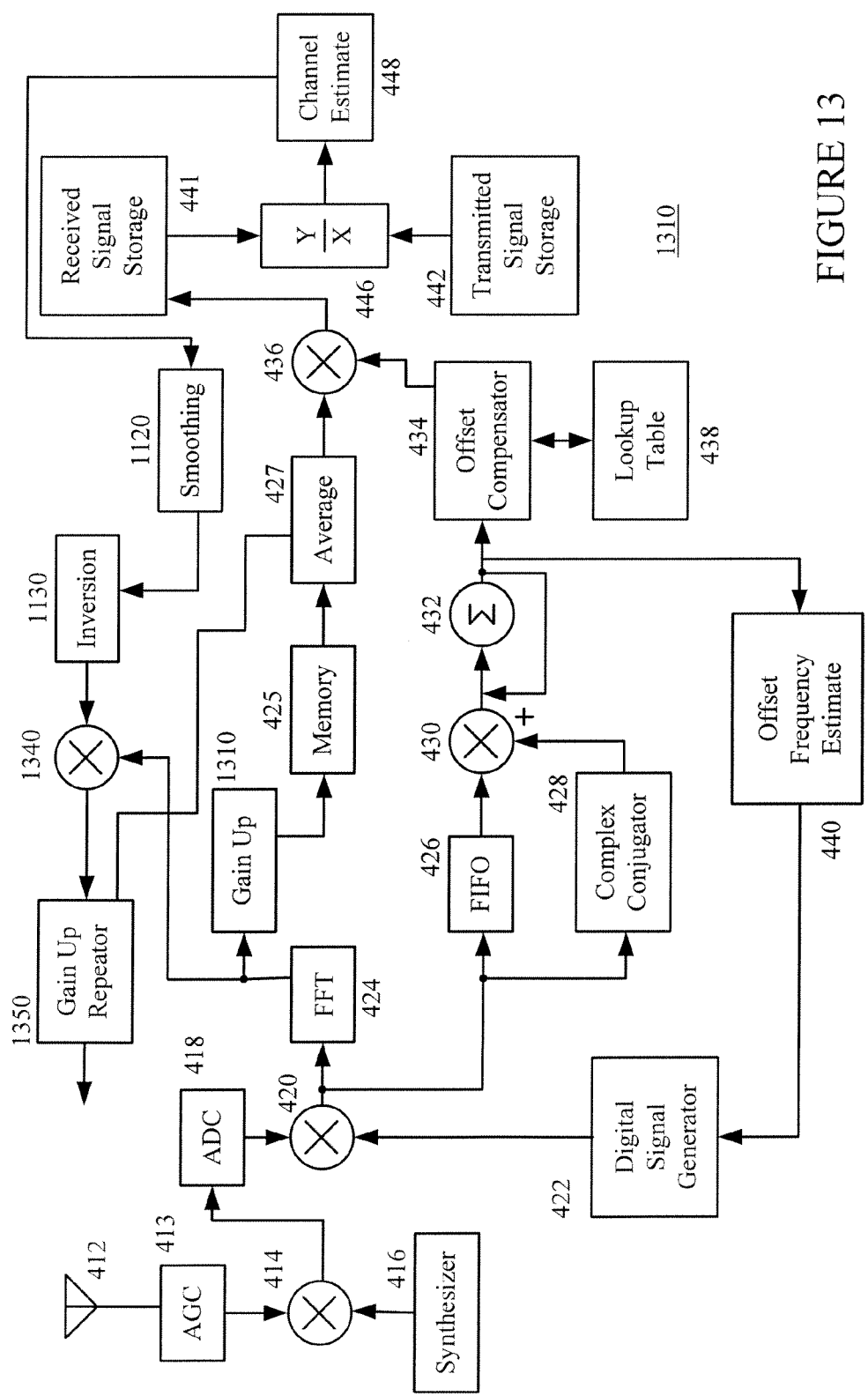
FIG. 13 illustrates a receiver according to yet another alternative embodiment in accordance with the present invention.

FIG. 13 illustrates a receiver 1300 according to yet another embodiment of the present invention. Receiver 1300 largely operates in a manner that is similar to receiver 1100, and the operation of most of its elements need not be repeated here. The essential differences lie in the fact that before multiplication occurs by multiplier 1340 gain up in receiver 1300 occurs only for the channel estimate and not the data symbols. Consequently, gain up is necessary after multiplier 1340. Gain up only occurs for the channel estimate because the frequency domain representation of a data symbol leaves unit 424 and arrives at multiplier 1340 without any intervening gain up. Gain up circuit 1310 operates in the same manner as gain up circuit 1110 and need not be described again here. Gain up repeater circuit 1350, on the other hand, according to one embodiment, does not perform process 1200, but in an alternative embodiment it may. Repeater circuit 1350 receives from gain up circuit 13 10 the number of minimum left shifts that were performed on the coefficients of the frequency domain representations of the long symbols. Repeater circuit 1350 performs the same number of minimum left shifts on the output of multiplier 1340. In the embodiment where repeater circuit 1350 repeats process 1200, circuit 1350 does not receive from circuit 1310 the number of minimum left shifts that were performed on the coefficients of the frequency domain representations of the long symbols.

Thus, methods and apparatus for estimating and calculating frequency offset and for more accurately determining the channel estimate have been described. Although the present invention has been described with reference to specific exemplary embodiments, it will be evident to one of ordinary skill in the art that various modifications and changes may be made to these embodiments without departing from the broader spirit and scope of the invention as set forth in the claims. Accordingly, the specification and drawings are to be regarded in an illustrative rather than a restrictive sense.

We claim:

1. A method for correcting influence of frequency offset between a receiver and a transmitter by evaluating training symbols received during a preamble period, the method comprising:
producing, based on at least one training symbol, a first vector whose first vector angle is indicative of a fine offset between the receiver and the transmitter;
producing a fine offset estimate based on the first vector angle; and
multiplying, with a signal having a frequency based upon the fine offset estimate, data symbols that are received after the at least one training symbol is received.

2. The method of claim 1, further comprising:
producing, based on the first vector angle, a frequency domain representation of a second signal having a second frequency substantially equivalent to the fine offset estimate; and
convolving the frequency domain representation of the second signal with a frequency domain representation of the at least one training symbol received at the receiver to produce an offset compensated frequency domain representation of the at least one training symbol that has effect of the frequency offset on channel transfer function between the receiver and the transmitter substantially removed.

3. The method of claim 2, producing, based on the at least one training symbol received at the receiver, the frequency domain representation of the at least one training symbol received at the receiver.

4. The method of claim 3, further comprising producing a channel estimate by dividing the offset compensated frequency domain representation of the at least one training symbol received at the receiver by a frequency domain representation of at least one training symbol that is substantially representative of the at least one training symbol as transmitted by the transmitter.

5. The method of claim 3, wherein the frequency domain representation of the at least one training symbol includes a frequency domain representation of a first training symbol and a frequency domain representation of a second training symbol, the method further comprising:
producing an average of the frequency domain representation of the at least one training symbol by averaging the frequency domain representation of the first training symbol and the frequency domain representation of the second training symbol;
producing the offset compensated frequency domain representation of the at least one training symbol based on the average by convolving the average of the frequency domain representation of the at least one training symbol with a frequency domain representation of a third signal;
producing a channel estimate by dividing the offset compensated frequency domain representation of the average with a frequency domain representation of the at least one training symbol that is substantially representative of the at least one training symbol as transmitted by the transmitter.

6. The method of claim 5, further comprising:
producing the frequency domain representation of the at least one training symbol that is substantially representative of the at least one training symbol as transmitted by the transmitter.

7. The method of claim 4, further comprising:
dividing an offset compensated frequency domain representation of a data symbol by the channel estimate to produce a representation of phase difference between at least one pilot in the data symbol and at least one pilot in the at least one training symbol; and producing, based on the representation of phase difference, an average of the phase difference between the at least one pilot in the data symbol and the at least one pilot in the at least one training symbol, and, based on the average of the phase difference, an updated frequency offset for application to a first signal generator.

8. The method of claim 4, further comprising:

providing an offset compensated frequency domain representation of a first data symbol and an offset compensated frequency domain representation of a second data symbol;

dividing the offset compensated frequency domain representation of the first data symbol by the offset compensated frequency domain representation of the second data symbol to produce a representation of phase difference between at least one pilot in the first data symbol and at least one pilot in the second data symbol; and producing, based on the representation of phase difference, an average of the phase difference between the at least one pilot in the first data symbol and the at least one pilot in the second data symbol, and, based on the average of the phase difference, an updated frequency offset for application to a first signal generator.

9. The method of claim 1, further comprising:

producing, based on the first vector angle, a first time domain periodic signal; and multiplying a time domain representation of the at least one training symbol with the first time domain periodic signal to produce an offset compensated time domain representation of the at least one training symbol.

10. The method of claim 9, further comprising:

transforming the offset compensated time domain representation of the at least one training symbol to produce an offset compensated frequency domain representation of the at least one training symbol received at the receiver; and producing a channel estimate by dividing the offset compensated frequency domain representation of the at least one training symbol received at the receiver by a frequency domain representation of the at least one training symbol that is substantially representative of the at least one training symbol as transmitted by the transmitter.

11. The method of claim 10, further comprising:

providing the frequency domain representation of the at least one training symbol that is substantially representative of the at least one training symbol as transmitted by the transmitter.

12. The method of claim 10, further comprising:

dividing an offset compensated frequency domain representation of a data symbol by the channel estimate to produce a representation of phase difference between at least one pilot in the data symbol and at least one pilot in the at least one training symbol received at the receiver; and producing, based on the representation of phase difference, an average of the phase difference between the at least one pilot in the data symbol and the at least one pilot in the at least one training symbol received at the receiver, and, based on the average of the phase difference, an updated frequency offset for application to a first signal generator.

13. The method of claim 10, further comprising:

providing an offset compensated frequency domain representation of a first data symbol and an offset compensated frequency domain representation of a second data symbol;

dividing the offset compensated frequency domain representation of the first data symbol by the offset compensated frequency domain representation of the second data symbol to produce a representation of phase difference between at least one pilot in the first data symbol and at least one pilot in the second data symbol; and producing, based on the representation of phase difference, an average of the phase difference between the at least one pilot in the first data symbol and the at least one pilot in the second data symbol, and, based on the average of the phase difference, an updated frequency offset.

14. The method of claim 1, further comprising:

receiving samples of short training symbols;

producing filtered samples of the short training symbols based on the received samples of the short training symbols; and subtracting the filtered samples of the short training symbols from the received samples of the short training symbols to produce short training symbol samples that have direct current substantially removed.

15. The method of claim 1, further comprising:

producing a second vector, based on summing samples of at least one short training symbol that have not been compensated for frequency offset, and a third vector, based on summing samples of another at least one short training symbol that have not been compensated for frequency offset;

calculating a direct current offset by evaluating $$\frac{(x1-x2)e^{(j\alpha)}}{N(1-e^{(j\alpha)})}$$

wherein $\alpha$ is the first vector angle, x1 is the second vector, x2 is the third vector, and N is number of samples in the at least one short training symbol that have not been compensated for frequency offset; and producing a difference between samples of symbols received after the short training symbols and the direct current offset.

16. The method of claim 1, further comprising:

producing a second vector, based on summing samples of at least one short training symbol that have not been compensated for frequency offset, and a third vector, based on summing samples of another at least one short training symbol that have not been compensated for frequency offset;

calculating a direct current offset by evaluating $$\frac{(x1-x2)}{2N}$$

wherein x1 is the second vector, x2 is the third vector, and N is number of samples in the at least one short training symbol that have not been compensated for frequency offset; and producing a difference between samples of symbols received after the short training symbols and the direct current offset.

17. An automatic frequency control circuit for correcting influence of frequency offset between a receiver and a transmitter by evaluating training symbols received during a preamble period, the circuit comprising:
an autocorrelator that is to produce, based on short training symbols, a first vector whose first vector angle is indicative of a coarse offset between the receiver and the transmitter and is to produce, based on at least one long training symbol, a second vector whose second vector angle is indicative of a fine offset between the receiver and the transmitter;
a frequency offset generator that is to produce a coarse offset estimate based on the first vector angle and a fine offset estimate based on the second vector angle;
a first signal generator that is to produce, based on the coarse offset estimate, a first periodic signal with a first frequency equivalent substantially to the coarse offset estimate;
a first mixer that is to produce a product of the at least one long training symbol received at the receiver and the first periodic signal and apply the product to the autocorrelator, wherein the autocorrelator is to produce the second vector based on the product;
wherein, after the fine offset estimate is produced by the frequency offset generator, the first signal generator is to produce a second periodic signal with a second frequency based upon the coarse offset estimate and the fine offset estimate; and
wherein the first mixer is to multiply, with the second periodic signal, symbols that are received after the at least one long training symbol is received.

18. The circuit of claim 17, further comprising:
an offset compensator that is to produce, based on the second vector angle, a frequency domain representation of a third signal having a third frequency substantially equivalent to the fine offset estimate; and
a convolver that is to convolve the frequency domain representation of the third signal with a frequency domain representation of the at least one long training symbol received at the receiver to produce an offset compensated frequency domain representation of the at least one long training symbol that has effect of the frequency offset between the receiver and the transmitter substantially removed.

19. The circuit of claim 18, further comprising a frequency domain transform unit that is to produce, based on the at least one long training symbol received at the receiver, the frequency domain representation of the at least one long training symbol received at the receiver.

20. The circuit of claim 19, further comprising a divider circuit that is to produce a channel estimate by dividing the offset compensated frequency domain representation of the at least one long training symbol received at the receiver by a frequency domain representation of at least one long training symbol that is substantially representative of the at least one long training symbol as transmitted by the transmitter.

21. The circuit of claim 19, wherein the frequency domain representation of the at least one long training symbol includes a frequency domain representation of a first long training symbol and a frequency domain representation of a second long training symbol, the circuit further comprising:
an averaging circuit that is to produce an average of the frequency domain representation of the at least one long training symbol by averaging the frequency domain representation of the first long training symbol and the frequency domain representation of the second long training symbol;
wherein the convolver is to produce the offset compensated frequency domain representation of the at least one training symbol based on the average by convolving the average of the frequency domain representation of the at least one long training symbol with the frequency domain representation of the third signal;
a divider circuit that is to produce a channel estimate by dividing the offset compensated frequency domain representation of the average with a frequency domain representation of the at least one long training symbol that is substantially representative of the at least one long training symbol as transmitted by the transmitter.

22. The circuit of claim 21, further comprising:
a long training symbol frequency domain representation unit that is to produce the frequency domain representation of the at least one long training symbol that is substantially representative of the at least one long training symbol as transmitted by the transmitter.

23. The circuit of claim 20, further comprising:
a second divider circuit that is to divide an offset compensated frequency domain representation of a data symbol by the channel estimate to produce a representation of phase difference between at least one pilot in the data symbol and at least one pilot in the at least one long training symbol; and
an average phase offset circuit that is to produce, based on the representation of phase difference, an average of the phase difference between the at least one pilot in the data symbol and the at least one pilot in the at least one long training symbol, and, based on the average of the phase difference, an updated frequency offset for application to the first signal generator.

24. The circuit of claim 17 further comprising:
a second signal generator that is to produce, based on the second vector angle, a third periodic signal; and
a second mixer that is to multiply a time domain representation of the at least one long training symbol with the third periodic signal to produce an offset compensated time domain representation of the at least one long training symbol.

25. The circuit of claim 24, further comprising:
a first frequency domain transform unit that is to transform the offset compensated time domain representation of the at least one long training symbol to produce an offset compensated frequency domain representation of the at least one long training symbol received at the receiver; and
a divider circuit that is to produce a channel estimate by dividing the offset compensated frequency domain representation of the at least one long training symbol received at the receiver by a frequency domain representation of the at least one long training symbol that is substantially representative of the at least one long training symbol as transmitted by the transmitter.

26. The circuit of claim 25, further comprising:
a long training symbol frequency domain representation unit that provides the frequency domain representation of the at least one long training symbol that is substantially representative of the at least one long training symbol as transmitted by the transmitter.

27. The circuit of claim 25, further comprising:
a second divider circuit that is to divide an offset compensated frequency domain representation of a data symbol by the channel estimate to produce a representation of phase difference between at least one pilot in the data symbol and at least one pilot in the at least one long training symbol received at the receiver;

an average phase offset circuit that is to produce, based on the representation of phase difference, an average of the phase difference between the at least one pilot in the data symbol and the at least one pilot in the at least one long training symbol received at the receiver, and, based on the average of the phase difference, an updated frequency offset for application to the first signal generator.

28. The circuit of claim 26, further comprising:
a low-pass filter that is to receive samples of the short training symbols and produce filtered samples of the short training symbols; and
a summer that is to produce, by subtracting the filtered samples of the short training symbols from the samples of the short training symbols, short training symbol samples that have direct current substantially removed for application to the autocorrelator.

29. The circuit of claim 26, further comprising:
a first summer that is to produce a third vector, based on summing samples of at least one short training symbol that have not been compensated for frequency offset, and a fourth vector, based on summing samples of another at least one short training symbol that have not been compensated for frequency offset;
a direct current offset compensator that is to receive the first vector, the third vector, and the fourth vector and is to calculate direct current offset by evaluating $$\frac{(x1-x2)e^{(j\alpha)}}{N(1-e^{(j\alpha)})}$$

wherein $\alpha$ is the first vector angle, x1 is the third vector, x2 is the fourth vector, and N is number of samples in the at least one short training symbol that have not been compensated for frequency offset; and
a second summer that is to produce a difference between samples of symbols received after the short training symbols and the direct current offset.

30. The circuit of claim 26, further comprising:
a first summer that is to produce a third vector, based on summing samples of at least one short training symbol that have not been compensated for frequency offset, and a fourth vector,
based on summing samples of another at least one short training symbol that have not been compensated for frequency offset;
a direct current offset compensator that is to receive the third vector, and the fourth vector and is to calculate direct current offset by evaluating $$\frac{(x1-x2)}{2N}$$

wherein x1 is the third vector, x2 is the fourth vector, and N is number of samples in the at least one short training symbol that have not been compensated for frequency offset; and
a second summer that is to produce a difference between samples of symbols received after the short training symbols and the direct current offset.

31. An automatic frequency control circuit for correcting influence of frequency offset between a receiver and a transmitter by evaluating training symbols received during a preamble period, the circuit comprising:
an autocorrelator that is to produce, based on short training symbols, a first vector whose first vector angle is indicative of a coarse offset between the receiver and the transmitter and is to produce, based on at least one long training symbol, a second vector whose second vector angle is indicative of a fine offset between the receiver and the transmitter;
a frequency offset generator that is to produce a coarse offset estimate based on the first vector angle and a fine offset estimate based on the second vector angle;
a first signal generator that is to produce, based on the coarse offset estimate, a first periodic signal with a first frequency equivalent substantially to the coarse offset estimate;
a first mixer that is to produce a product of the at least one long training symbol received at the receiver and the first periodic signal and apply the product to the autocorrelator, wherein the autocorrelator is to produce the second vector based on the product;
wherein, after the fine offset estimate is produced by the frequency offset generator, the first signal generator is to produce a second periodic signal with a second frequency equivalent substantially to a sum of the coarse offset estimate and the fine offset estimate;
wherein the first mixer is to multiply, with the second periodic signal, symbols that are received after the at least one long training symbol is received;
an offset compensator that is produce, based on the second vector angle, a frequency domain representation of a third signal having a third frequency substantially equivalent to the fine offset estimate; and
a convolver that is to convolve the frequency domain representation of the third signal with a frequency domain representation of the at least one long training symbol received at the receiver to produce an offset compensated frequency domain representation of the at least one long training symbol that has effect of the frequency offset on channel transfer function between the receiver and the transmitter substantially removed.

32. The circuit of claim 31, further comprising a divider circuit that is to produce a channel estimate by dividing the offset compensated frequency domain representation of the at least one long training symbol received at the receiver by a frequency domain representation of at least one long training symbol that is substantially representative of the at least one long training symbol as transmitted by the transmitter.

33. The circuit of claim 32, further comprising:
a second divider circuit that is to divide an offset compensated frequency domain representation of a data symbol by the channel estimate to produce a representation of phase difference between at least one pilot in the data symbol and at least one pilot in the at least one long training symbol; and
an average phase offset circuit that is to produce, based on the representation of phase difference, an average of the phase difference between the at least one pilot in the data symbol and the at least one pilot in the at least one long training symbol, and, based on the average of the phase difference, an updated frequency offset for application to the first signal generator.

34. An automatic frequency control circuit for correcting influence of frequency offset between a receiver and a transmitter by evaluating training symbols received during a preamble period, the circuit comprising:

an autocorrelator that is to produce, based on short training symbols, a first vector whose first vector angle is indicative of a coarse offset between the receiver and the transmitter and is to produce, based on at least one long training symbol, a second vector whose second vector angle is indicative of a fine offset between the receiver and the transmitter;

a frequency offset generator that is to produce a coarse offset estimate based on the first vector angle and a fine offset estimate based on the second vector angle;

a first signal generator that is to produce, based on the coarse offset estimate, a first periodic signal with a first frequency equivalent substantially to the coarse offset estimate;

a first mixer that is to produce a product of the at least one long training symbol received at the receiver and the first periodic signal and apply the product to the autocorrelator, wherein the autocorrelator is to produce the second vector based on the product;

wherein, after the fine offset estimate is produced by the frequency offset generator, the first signal generator is to produce a second periodic signal with a second frequency equivalent substantially to a sum of the coarse offset estimate and the fine offset estimate; and wherein the first mixer is to multiply, with the second periodic signal, symbols that are received after the at least one long training symbol is received; and a second signal generator that is to produce, based on the second vector angle, a third periodic signal; and a second mixer that is to multiply a time domain representation of the at least one long training symbol with the third periodic signal to produce an offset compensated time domain representation of the at least one long training symbol.

35. The circuit of claim 34, further comprising:

a first frequency domain transform unit that is to transform the offset compensated time domain representation of the at least one long training symbol to produce an offset compensated frequency domain representation of the at least one long training symbol received at the receiver; and a divider circuit that is to produce a channel estimate by dividing the offset compensated frequency domain representation of the at least one long training symbol received at the receiver by a frequency domain representation of the at least one long training symbol that is substantially representative of the at least one long training symbol as transmitted by the transmitter.

36. The circuit of claim 35, further comprising:

a second divider circuit that is to divide an offset compensated frequency domain representation of a data symbol by the channel estimate to produce a representation of phase difference between at least one pilot in the data symbol and at least one pilot in the at least one long training symbol received at the receiver;

an average phase offset circuit that is to produce, based on the representation of phase difference, an average of the phase difference between the at least one pilot in the data symbol and the at least one pilot in the at least one long training symbol received at the receiver, and, based on the average of the phase difference, an updated frequency offset for application to the first signal generator.

37. An automatic frequency control circuit for correcting influence of frequency offset between a receiver and a transmitter by evaluating training symbols received during a preamble period, the circuit comprising:

an autocorrelator that is to produce, based on short training symbols, a first vector whose first vector angle is indicative of a coarse offset between the receiver and the transmitter and is to produce, based on at least one long training symbol, a second vector whose second vector angle is indicative of a fine offset between the receiver and the transmitter;

a frequency offset generator that is to produce a coarse offset estimate based on the first vector angle and a fine offset estimate based on the second vector angle;

a first signal generator that is to produce, based on the coarse offset estimate, a first periodic signal with a first frequency equivalent substantially to the coarse offset estimate;

a first mixer that is to produce a product of the at least one long training symbol received at the receiver and the first periodic signal and apply the product to the autocorrelator, wherein the autocorrelator is to produce the second vector based on the product;

wherein, after the fine offset estimate is produced by the frequency offset generator, the first signal generator is to produce a second periodic signal with a second frequency equivalent substantially to a sum of the coarse offset estimate and the fine offset estimate;

wherein the first mixer is to multiply, with the second periodic signal, symbols that are received after the at least one long training symbol is received;

a low-pass filter that is to receive samples of the short training symbols and produce filtered samples of the short training symbols; and a summer that is to produce, by subtracting the filtered samples of the short training symbols from the samples of the short training symbols, short training symbol samples that have direct current substantially removed for application to the autocorrelator.

38. An automatic frequency control circuit for correcting influence of frequency offset between a receiver and a transmitter by evaluating training symbols received during a preamble period, the circuit comprising:

an autocorrelator that is to produce, based on short training symbols, a first vector whose first vector angle is indicative of a coarse offset between the receiver and the transmitter and is to produce, based on at least one long training symbol, a second vector whose second vector angle is indicative of a fine offset between the receiver and the transmitter;

a frequency offset generator that is to produce a coarse offset estimate based on the first vector angle and a fine offset estimate based on the second vector angle;

a first signal generator that is to produce, based on the coarse offset estimate, a first periodic signal with a first frequency equivalent substantially to the coarse offset estimate;

a first mixer that is to produce a product of the at least one long training symbol received at the receiver and the first periodic signal and apply the product to the autocorrelator, wherein the autocorrelator is to produce the second vector based on the product;

wherein, after the fine offset estimate is produced by the frequency offset generator, the first signal generator is to produce a second periodic signal with a second frequency based on the coarse offset estimate and the fine offset estimate;

wherein the first mixer is to multiply, with the second periodic signal, symbols that are received after the at least one long training symbol is received;

a first summer that is to produce a third vector, based on summing samples of at least one short training symbol that have not been compensated for frequency offset, and a fourth vector, based on summing samples of another at least one short training symbol that have not been compensated for frequency offset;

a direct current offset compensator that is to receive the first vector, the third vector, and the fourth vector and is to calculate direct current offset by evaluating $$\frac{(x1 - x2)e^{(j\alpha)}}{N(1 - e^{(j\alpha)})}$$

wherein α is the first vector angle, x1 is the third vector, x2 is the fourth vector, and N is number of samples in the at least one short training symbol that have not been compensated for frequency offset; and a second summer that is to produce a difference between samples of symbols received after the short training symbols and the direct current offset.

39. An automatic frequency control circuit for correcting influence of frequency offset between a receiver and a transmitter by evaluating training symbols received during a preamble period, the circuit comprising:

an autocorrelator that is to produce, based on short training symbols, a first vector whose first vector angle is indicative of a coarse offset between the receiver and the transmitter and is to produce, based on at least one long training symbol, a second vector whose second vector angle is indicative of a fine offset between the receiver and the transmitter;

a frequency offset generator that is to produce a coarse offset estimate based on the first vector angle and a fine offset estimate based on the second vector angle;

a first signal generator that is to produce, based on the coarse offset estimate, a first periodic signal with a first frequency equivalent substantially to the coarse offset estimate;

a first mixer that is to produce a product of the at least one long training symbol received at the receiver and the first periodic signal and apply the product to the autocorrelator, wherein the autocorrelator is to produce the second vector based on the product;

wherein, after the fine offset estimate is produced by the frequency offset generator, the first signal generator is to produce a second periodic signal with a second frequency equivalent substantially to a sum of the coarse offset estimate and the fine offset estimate;

wherein the first mixer is to multiply, with the second periodic signal, symbols that are received after the at least one long training symbol is received;

a first summer that is to produce a third vector, based on summing samples of at least one short training symbol that have not been compensated for frequency offset, and a fourth vector, based on summing samples of another at least one short training symbol that have not been compensated for frequency offset;

a direct current offset compensator that is to receive the third vector, and the fourth vector and is to calculate direct current offset by evaluating $$\frac{(x1 + x2)}{2N}$$

wherein x1 is the third vector, x2 is the fourth vector, and N is number of samples in the at least one short training symbol that have not been compensated for frequency offset; and a second summer that is to produce a difference between samples of symbols received after the short training symbols and the direct current offset.

40. A method for correcting influence of frequency offset between a receiver and a transmitter by evaluating training symbols received during a preamble period, the method comprising:

producing, based on short training symbols, a first vector whose first vector angle is indicative of a coarse offset between the receiver and the transmitter and, based on at least one long training symbol, a second vector whose second vector angle is indicative of a fine offset between the receiver and the transmitter;

producing a coarse offset estimate based on the first vector angle and a fine offset estimate based on the second vector angle;

producing based on the coarse offset estimate, a first periodic signal with a first frequency equivalent substantially to the coarse offset estimate;

producing a product of the at least one long training symbol received at the receiver and the first periodic signal and apply the product to an autocorrelator, wherein the autocorrelator is to produce the second vector based on the product;

generating, after the fine offset estimate is produced, a second periodic signal with a second frequency based on the coarse offset estimate and the fine offset estimate; and multiplying, with the second periodic signal, symbols that are received after the at least one long training symbol is received.

41. The method of claim 40, further comprising:

producing, based on the second vector angle, a frequency domain representation of a third signal having a third frequency substantially equivalent to the fine offset estimate; and convolving the frequency domain representation of the third signal with a frequency domain representation of the at least one long training symbol received at the receiver to produce an offset compensated frequency domain representation of the at least one long training symbol that has effect of the frequency offset between the receiver and the transmitter substantially removed.

42. The method of claim 41, producing, based on the at least one long training symbol received at the receiver, the frequency domain representation of the at least one long training symbol received at the receiver.

43. The method of claim 42, further comprising producing a channel estimate by dividing the offset compensated frequency domain representation of the at least one long training symbol received at the receiver by a frequency domain representation of at least one long training symbol that is substantially representative of the at least one long training symbol as transmitted by the transmitter.

44. The method of claim 42, wherein the frequency domain representation of the at least one long training symbol includes a frequency domain representation of a first long training symbol and a frequency domain representation of a second long training symbol, the method further comprising:

producing an average of the frequency domain representation of the at least one long training symbol by averaging the frequency domain representation of the first long training symbol and the frequency domain representation of the second long training symbol;

producing the offset compensated frequency domain representation of the at least one training symbol based on the average by convolving the average of the frequency domain representation of the at least one long training symbol with the frequency domain representation of the third signal;

producing a channel estimate by dividing the offset compensated frequency domain representation of the average with a frequency domain representation of the at least one long training symbol that is substantially representative of the at least one long training symbol as transmitted by the transmitter.

45. The method of claim 44, further comprising:
producing the frequency domain representation of the at least one long training symbol that is substantially representative of the at least one long training symbol as transmitted by the transmitter.

46. The method of claim 43, further comprising:
dividing an offset compensated frequency domain representation of a data symbol by the channel estimate to produce a representation of phase difference between at least one pilot in the data symbol and at least one pilot in the at least one long training symbol; and producing, based on the representation of phase difference, an average of the phase difference between the at least one pilot in the data symbol and the at least one pilot in the at least one long training symbol, and, based on the average of the phase difference, an updated frequency offset for application to a first signal generator.

47. The method of claim 43, further comprising:
providing an offset compensated frequency domain representation of a first data symbol and an offset compensated frequency domain representation of a second data symbol;

dividing the offset compensated frequency domain representation of the first data symbol by the offset compensated frequency domain representation of the second data symbol to produce a representation of phase difference between at least one pilot in the first data symbol and at least one pilot in the second data symbol; and producing, based on the representation of phase difference, an average of the phase difference between the at least one pilot in the first data symbol and the at least one pilot in the second data symbol, and, based on the average of the phase difference, an updated frequency offset for application to a first signal generator.

48. The method of claim 40, further comprising:
producing, based on the second vector angle, a third periodic signal; and multiplying a time domain representation of the at least one long training symbol with the third periodic signal to produce an offset compensated time domain representation of the at least one long training symbol.

49. The method of claim 48, further comprising:
transforming the offset compensated time domain representation of the at least one long training symbol to produce an offset compensated frequency domain representation of the at least one long training symbol received at the receiver; and producing a channel estimate by dividing the offset compensated frequency domain representation of the at least one long training symbol received at the receiver by a frequency domain representation of the at least one long training symbol that is substantially representative of the at least one long training symbol as transmitted by the transmitter.

50. The method of claim 49, further comprising:
providing the frequency domain representation of the at least one long training symbol that is substantially representative of the at least one long training symbol as transmitted by the transmitter.

51. The method of claim 49, further comprising:
dividing an offset compensated frequency domain representation of a data symbol by the channel estimate to produce a representation of phase difference between at least one pilot in the data symbol and at least one pilot in the at least one long training symbol received at the receiver;

producing, based on the representation of phase difference, an average of the phase difference between the at least one pilot in the data symbol and the at least one pilot in the at least one long training symbol received at the receiver, and, based on the average of the phase difference, an updated frequency offset for application to a first signal generator.

52. The method of claim 49, further comprising:
providing an offset compensated frequency domain representation of a first data symbol and an offset compensated frequency domain representation of a second data symbol;

dividing the offset compensated frequency domain representation of the first data symbol by the offset compensated frequency domain representation of the second data symbol to produce a representation of phase difference between at least one pilot in the first data symbol and at least one pilot in the second data symbol; and producing, based on the representation of phase difference, an average of the phase difference between the at least one pilot in the first data symbol and the at least one pilot in the second data symbol, and, based on the average of the phase difference, an updated frequency offset.

53. The method of claim 40, further comprising:
receiving samples of the short training symbols;
producing filtered samples of the short training symbols based on the received samples of the short training symbols; and subtracting the filtered samples of the short training symbols from the samples of the short training symbols to produce short training symbol samples that have direct current substantially removed.

54. The method of claim 40, further comprising:
producing a third vector, based on summing samples of at least one short training symbol that have not been compensated for frequency offset, and a fourth vector, based on summing samples of another at least one short training symbol that have not been compensated for frequency offset;

calculating a direct current offset by evaluating $$\frac{(x1 - x2)e^{(j\alpha)}}{N(1 - e^{(j\alpha)})}$$

wherein α is the first vector angle, x1 is the third vector, x2 is the fourth vector, and N is number of samples in the at least one short training symbol that have not been compensated for frequency offset; and producing a difference between samples of symbols received after the short training symbols and the direct current offset.

55. The method of claim 40, further comprising:
producing a third vector, based on summing samples of at least one short training symbol that have not been compensated for frequency offset, and a fourth vector, based on summing samples of another at least one short training symbol that have not been compensated for frequency offset;
calculating a direct current offset by evaluating $$\frac{(x1 + x2)}{2N}$$

wherein x1 is the third vector, x2 is the fourth vector, and N is number of samples in the at least one short training symbol that have not been compensated for frequency offset; and
producing a difference between samples of symbols received after the short training symbols and the direct current offset.

56. A method for correcting influence of frequency offset between a receiver and a transmitter by evaluating training symbols received during a preamble period, the method comprising:
producing, based on short training symbols, a first vector whose first vector angle is indicative of a coarse offset between the receiver and the transmitter and is to produce, based on at least one long training symbol, a second vector whose second vector angle is indicative of a fine offset between the receiver and the transmitter;
producing a coarse offset estimate based on the first vector angle and a fine offset estimate based on the second vector angle;
producing based on the coarse offset estimate, a first periodic signal with a first frequency equivalent substantially to the coarse offset estimate;
producing a product of the at least one long training symbol received at the receiver and the first periodic signal and apply the product to an autocorrelator, wherein the autocorrelator is to produce the second vector based on the product;
generating, after the fine offset estimate is produced, a second periodic signal with a second frequency equivalent substantially to a sum of the coarse offset estimate and the fine offset estimate;
multiplying, with the second periodic signal, symbols that are received after the at least one long training symbol is received;
producing, based on the second vector angle, a frequency domain representation of a third signal having a third frequency substantially equivalent to the fine offset estimate; and
convolving the frequency domain representation of the third signal with a frequency domain representation of the at least one long training symbol received at the receiver to produce an offset compensated frequency domain representation of the at least one long training symbol that has effect of the frequency offset on channel transfer function between the receiver and the transmitter substantially removed.

57. The method of claim 56, further comprising producing a channel estimate by dividing the offset compensated frequency domain representation of the at least one long training symbol received at the receiver by a frequency domain representation of at least one long training symbol that is substantially representative of the at least one long training symbol as transmitted by the transmitter.

58. The method of claim 57, further comprising:
dividing an offset compensated frequency domain representation of a data symbol by the channel estimate to produce a representation of phase difference between at least one pilot in the data symbol and at least one pilot in the at least one long training symbol; and
producing, based on the representation of phase difference, an average of the phase difference between the at least one pilot in the data symbol and the at least one pilot in the at least one long training symbol, and, based on the average of the phase difference, an updated frequency offset for application to a first signal generator.

59. The method of claim 57, further comprising:
providing an offset compensated frequency domain representation of a first data symbol and an offset compensated frequency domain representation of a second data symbol;
dividing the offset compensated frequency domain representation of the first data symbol by the offset compensated frequency domain representation of the second data symbol to produce a representation of phase difference between at least one pilot in the first data symbol and at least one pilot in the second data symbol; and
producing, based on the representation of phase difference, an average of the phase difference between the at least one pilot in the first data symbol and the at least one pilot in the second data symbol, and, based on the average of the phase difference, an updated frequency offset for application to a first signal generator.

60. The method of claim 57, wherein the frequency domain representation of the at least one long training symbol includes a frequency domain representation of a first long training symbol and a frequency domain representation of a second long training symbol, the method further comprising:
producing an average of the frequency domain representation of the at least one long training symbol by averaging the frequency domain representation of the first long training symbol and the frequency domain representation of the second long training symbol;
producing offset compensated frequency domain representation of the at least one training symbol based on the average by convolving the average of the frequency domain representation of the at least one long training symbol with the frequency domain representation of the third signal;
producing the channel estimate by dividing the offset compensated frequency domain representation of the average with a frequency domain representation of the at least one long training symbol that is substantially representative of the at least one long training symbol as transmitted by the transmitter.

61. A method for correcting influence of frequency offset between a receiver and a transmitter by evaluating training symbols received during a preamble period, the method comprising:
producing, based on short training symbols, a first vector whose first vector angle is indicative of a coarse offset between the receiver and the transmitter and is to produce, based on at least one long training symbol, a second vector whose second vector angle is indicative of a fine offset between the receiver and the transmitter;

producing a coarse offset estimate based on the first vector angle and a fine offset estimate based on the second vector angle;

producing based on the coarse offset estimate, a first periodic signal with a first frequency equivalent substantially to the coarse offset estimate;

producing a product of the at least one long training symbol received at the receiver and the first periodic signal and apply the product to an autocorrelator, wherein the autocorrelator is to produce the second vector based on the product;

generating, after the fine offset estimate is produced, a second periodic signal with a second frequency equivalent substantially to a sum of the coarse offset estimate and the fine offset estimate;

multiplying, with the second periodic signal, symbols that are received after the at least one long training symbol is received;

producing, based on the second vector angle, a third periodic signal; and multiplying a time domain representation of the at least one long training symbol with the third periodic signal to produce an offset compensated time domain representation of the at least one long training symbol.

62. The method of claim 61, further comprising:

transforming the offset compensated time domain representation of the at least one long training symbol to produce an offset compensated frequency domain representation of the at least one long training symbol received at the receiver; and producing a channel estimate by dividing the offset compensated frequency domain representation of the at least one long training symbol received at the receiver by a frequency domain representation of the at least one long training symbol that is substantially representative of the at least one long training symbol as transmitted by the transmitter.

63. The method of claim 62, further comprising:

dividing an offset compensated frequency domain representation of a data symbol by the channel estimate to produce a representation of phase difference between at least one pilot in the data symbol and at least one pilot in the at least one long training symbol received at the receiver;

producing, based on the representation of phase difference, an average of the phase difference between the at least one pilot in the data symbol and the at least one pilot in the at least one long training symbol received at the receiver, and, based on the average of the phase difference, an updated frequency offset for application to a first signal generator.

64. The method of claim 62, further comprising:

providing an offset compensated frequency domain representation of a first data symbol and an offset compensated frequency domain representation of a second data symbol;

dividing the offset compensated frequency domain representation of the first data symbol by the offset compensated frequency domain representation of the second data symbol to produce a representation of phase difference between at least one pilot in the first data symbol and at least one pilot in the second data symbol; and producing, based on the representation of phase difference, an average of the phase difference between the at least one pilot in the first data symbol and the at least one pilot in the second data symbol, and, based on the average of the phase difference, an updated frequency offset.

65. An automatic frequency control circuit for correcting influence of frequency offset between a receiver and a transmitter by evaluating training symbols received during a preamble period, the circuit comprising:

an autocorrelator that is to produce, based on short training symbols, a first vector whose first vector angle is indicative of a coarse offset between the receiver and the transmitter and is to produce, based on at least one long training symbol, a second vector whose second vector angle is indicative of a fine offset between the receiver and the transmitter;

a frequency offset generator that is to produce a coarse offset estimate based on the first vector angle and a fine offset estimate based on the second vector angle;

a first signal generator that is to produce, based on the coarse offset estimate, a first periodic signal with a first frequency equivalent substantially to the coarse offset estimate;

a first mixer that is to produce a product of the at least one long training symbol received at the receiver and the first periodic signal and apply the product to the autocorrelator, wherein the autocorrelator is to produce the second vector based on the product;

wherein, after the fine offset estimate is produced by the frequency offset generator, the first signal generator is to produce a second periodic signal with a second frequency equivalent substantially to a sum of the coarse offset estimate and the fine offset estimate;

wherein the first mixer is to multiply, with the second periodic signal, symbols that are received after the at least one long training symbol is received;

receiving samples of the short training symbols;

producing filtered samples of the short training symbols based on the received samples of the short training symbols; and subtracting the filtered samples of the short training symbols from the samples of the short training symbols to produce short training symbol samples that have direct current substantially removed.

66. An automatic frequency control circuit for correcting influence of frequency offset between a receiver and a transmitter by evaluating training symbols received during a preamble period, the circuit comprising:

an autocorrelator that is to produce, based on short training symbols, a first vector whose first vector angle is indicative of a coarse offset between the receiver and the transmitter and is to produce, based on at least one long training symbol, a second vector whose second vector angle is indicative of a fine offset between the receiver and the transmitter;

a frequency offset generator that is to produce a coarse offset estimate based on the first vector angle and a fine offset estimate based on the second vector angle;

a first signal generator that is to produce, based on the coarse offset estimate, a first periodic signal with a first frequency equivalent substantially to the coarse offset estimate;

a first mixer that is to produce a product of the at least one long training symbol received at the receiver and the first periodic signal and apply the product to the autocorrelator, wherein the autocorrelator is to produce the second vector based on the product;

wherein, after the fine offset estimate is produced by the frequency offset generator, the first signal generator is to produce a second periodic signal with a second frequency equivalent substantially to a sum of the coarse offset estimate and the fine offset estimate;

wherein the first mixer is to multiply, with the second periodic signal, symbols that are received after the at least one long training symbol is received;

producing a third vector, based on summing samples of at least one short training symbol that have not been compensated for frequency offset, and a fourth vector, based on summing samples of another at least one short training symbol that have not been compensated for frequency offset;

calculating a direct current offset by evaluating $$\frac{(x1 - x2)e^{(j\alpha)}}{N(1 - e^{(j\alpha)})}$$

wherein $\alpha$ is the first vector angle, x1 is the third vector, x2 is the fourth vector, and N is number of samples in the at least one short training symbol that have not been compensated for frequency offset; and producing a difference between samples of symbols received after the short training symbols and the direct current offset.

67. An automatic frequency control circuit for correcting influence of frequency offset between a receiver and a transmitter by evaluating training symbols received during a preamble period, the circuit comprising:

an autocorrelator that is to produce, based on short training symbols, a first vector whose first vector angle is indicative of a coarse offset between the receiver and the transmitter and is to produce, based on at least one long training symbol, a second vector whose second vector angle is indicative of a fine offset between the receiver and the transmitter;

a frequency offset generator that is to produce a coarse offset estimate based on the first vector angle and a fine offset estimate based on the second vector angle;

a first signal generator that is to produce, based on the coarse offset estimate, a first periodic signal with a first frequency equivalent substantially to the coarse offset estimate;

a first mixer that is to produce a product of the at least one long training symbol received at the receiver and the first periodic signal and apply the product to the autocorrelator, wherein the autocorrelator is to produce the second vector based on the product;

wherein, after the fine offset estimate is produced by the frequency offset generator, the first signal generator is to produce a second periodic signal with a second frequency equivalent substantially to a sum of the coarse offset estimate and the fine offset estimate;

wherein the first mixer is to multiply, with the second periodic signal, symbols that are received after the at least one long training symbol is received;

producing a third vector, based on summing samples of at least one short training symbol that have not been compensated for frequency offset, and a fourth vector, based on sunning samples of another at least one short training symbol that have not been compensated for frequency offset;

calculating a direct current offset by evaluating $$\frac{(x1 + x2)}{2N}$$

wherein x1 is the third vector, x2 is the fourth vector, and N is number of samples in the at least one short training symbol that have not been compensated for frequency offset; and producing a difference between samples of symbols received after the short training symbols and the direct current offset.

* * * * *